(12) United States Patent
Arai et al.

(10) Patent No.: US 12,548,841 B2
(45) Date of Patent: Feb. 10, 2026

(54) VEHICLE STRUCTURE

(71) Applicants: Teijin Limited, Osaka (JP); Teijin Automotive Technologies, Inc., Auburn Hills, MI (US)

(72) Inventors: Tsukasa Arai, Osaka (JP); Yoshiki Kashiwagi, Osaka (JP); Shota Nagata, Osaka (JP); Hiroshi Miyauchi, Osaka (JP); Masatomo Teshima, Osaka (JP); Hugh Foran, Auburn Hills, MI (US); Max Kamiyama, Osaka (JP)

(73) Assignees: Teijin Limited, Osaka (JP); Teijin Automotive Technologies, Inc., Auburn Hills, MI (US)

( * ) Notice: Subject to any disclaimer, the term of this patent is extended or adjusted under 35 U.S.C. 154(b) by 334 days.

(21) Appl. No.: 18/265,729

(22) PCT Filed: Dec. 2, 2021

(86) PCT No.: PCT/US2021/061558
§ 371 (c)(1),
(2) Date: Jun. 7, 2023

(87) PCT Pub. No.: WO2022/125366
PCT Pub. Date: Jun. 16, 2022

(65) Prior Publication Data
US 2024/0047809 A1 Feb. 8, 2024

Related U.S. Application Data

(60) Provisional application No. 63/122,048, filed on Dec. 7, 2020.

(51) Int. Cl.
*H01M 50/249* (2021.01)
*B60K 1/04* (2019.01)
(Continued)

(52) U.S. Cl.
CPC ............ *H01M 50/249* (2021.01); *B60K 1/04* (2013.01); *B62D 27/065* (2013.01);
(Continued)

(58) Field of Classification Search
CPC ............ H01M 50/249; H01M 50/209; H01M 50/222; H01M 50/227; H01M 50/229;
(Continued)

(56) References Cited

U.S. PATENT DOCUMENTS 6,085,854 A * 7/2000 Nishikawa .......... H01M 10/613
180/68.5
8,835,033 B2 9/2014 Choi et al.
(Continued)

FOREIGN PATENT DOCUMENTS

CN  108454370 A  8/2018
DE  102017005313 A1 * 12/2018 .......... H01M 50/271
(Continued)

OTHER PUBLICATIONS

JP-2014080116-A English Translation (Year: 2014).*
(Continued)

*Primary Examiner* — Michael T. Walsh
(74) *Attorney, Agent, or Firm* — MaxGoLaw PLLC

(57) ABSTRACT

Provided is a vehicle structure disposed at a lower portion of a center of a vehicle body, the vehicle structure including: a battery cover, a battery tray, and a structural member A for absorbing impact energy. Each of the battery cover and the battery tray is configured with an integrally molded fiber-reinforced plastic. The structural member A is located outside in a vehicle width direction of at least the battery cover and the battery tray. The structural member A is fastened together with the battery cover and the battery tray.

16 Claims, 14 Drawing Sheets

(51) Int. Cl.
  *B62D 27/06* (2006.01)
  *B62D 29/04* (2006.01)
  *H01M 50/209* (2021.01)
  *H01M 50/222* (2021.01)
  *H01M 50/227* (2021.01)
  *H01M 50/229* (2021.01)
  *H01M 50/242* (2021.01)
  *H01M 50/262* (2021.01)
  *H01M 50/276* (2021.01)
  *H01M 50/278* (2021.01)
  *H01M 50/28* (2021.01)
  *B62D 21/15* (2006.01)

(52) U.S. Cl.
  CPC ........ *B62D 29/043* (2013.01); *H01M 50/209* (2021.01); *H01M 50/222* (2021.01); *H01M 50/227* (2021.01); *H01M 50/229* (2021.01); *H01M 50/242* (2021.01); *H01M 50/262* (2021.01); *H01M 50/276* (2021.01); *H01M 50/278* (2021.01); *H01M 50/28* (2021.01); *B62D 21/15* (2013.01); *H01M 2220/20* (2013.01)

(58) Field of Classification Search
  CPC ............ H01M 50/242; H01M 50/262; H01M 50/276; H01M 50/278; H01M 50/28; H01M 2220/20; H01M 50/204; H01M 50/244; H01M 50/20; H01M 50/24; H01M 50/59; B60K 1/04; B60K 2001/0438; B60K 1/00; B62D 27/065; B62D 29/043; B62D 21/15
  See application file for complete search history.

(56) References Cited

U.S. PATENT DOCUMENTS

| | | | | |
|---|---|---|---|---|
| 9,056,631 | B2* | 6/2015 | Nakamori | H01M 50/227 |
| 10,461,383 | B2* | 10/2019 | Haag | H01M 50/264 |
| 11,211,656 | B2* | 12/2021 | Matecki | H01M 50/271 |
| 2013/0119706 | A1 | 5/2013 | Katayama et al. | |
| 2018/0237075 | A1 | 8/2018 | Kawabe et al. | |
| 2018/0337377 | A1* | 11/2018 | Stephens | H01M 50/224 |
| 2019/0081297 | A1* | 3/2019 | Nakamori | H01M 50/124 |
| 2020/0114972 | A1 | 4/2020 | Lee et al. | |

FOREIGN PATENT DOCUMENTS

| | | | | |
|---|---|---|---|---|
| DE | 102017005314 A1 * | 12/2018 | ......... | H01M 50/271 |
| EP | 2332761 A1 | 6/2011 | | |
| ES | 2382248 T3 * | 6/2012 | ........ | H01M 10/0413 |
| JP | 2008174181 A | 7/2008 | | |
| JP | 2010153130 A | 7/2010 | | |
| JP | 2011124101 A | 6/2011 | | |
| JP | 2013201112 A | 10/2013 | | |
| JP | 2014024488 A | 2/2014 | | |
| JP | 2014080116 A * | 5/2014 | | |
| JP | 2017196952 A * | 11/2017 | ......... | B62D 25/2036 |
| JP | 2018131133 A | 8/2018 | | |
| JP | 2020055504 A | 4/2020 | | |
| JP | 2022111787 A * | 8/2022 | ............... | B60K 1/04 |
| WO | WO-2012063393 A1 * | 5/2012 | ............. | B60L 58/21 |
| WO | WO-2013105340 A1 * | 7/2013 | ............. | C08J 5/042 |
| WO | 2020227458 A1 | 11/2020 | | |

OTHER PUBLICATIONS

DE-102017005314-A1 English Translation (Year: 2018).*
WO-2013105340-A1 English Translation (Year: 2013).*
WO-2012063393-A1 English Translation (Year: 2012).*
DE-102017005313-A1 English Translation (Year: 2018).*
ES-2382248-T3 English Translation (Year: 2012).*
JP-2022111787-A English Translation (Year: 2022).*
JP-2017196952-A English Translation (Year: 2017).*
Int'l Search Report for PCT/US2021/061558, dated Mar. 4, 2022.
Office Action issued in corresponding Japanese Appln. No. 2023-534159, dated Oct. 1, 2024.

* cited by examiner

FIG. 9
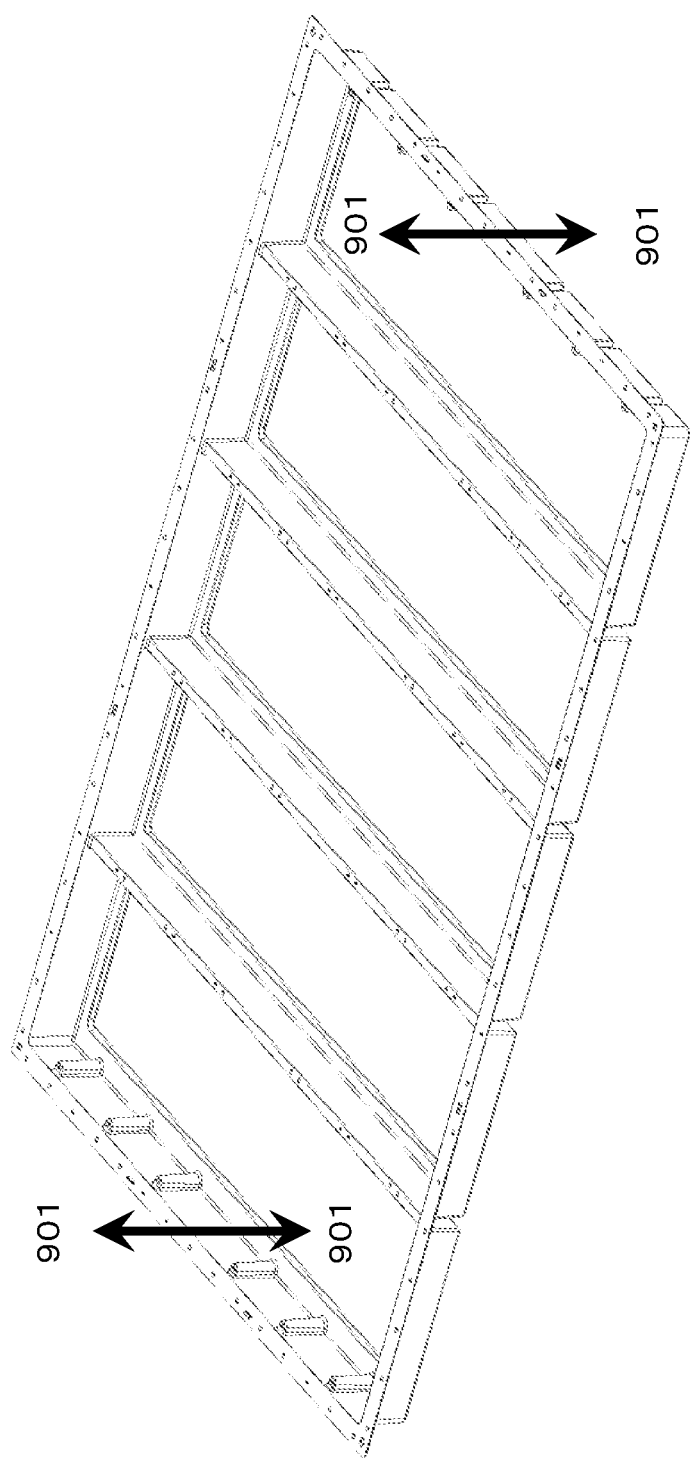
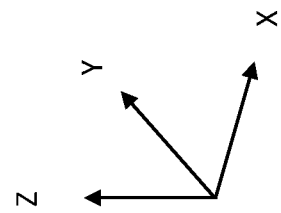

VEHICLE STRUCTURE

TECHNICAL FIELD

The present invention relates to a vehicle structure that is disposed at a lower portion of a center of a vehicle body and includes a battery tray, a battery cover, and a structural member for absorbing impact energy.

BACKGROUND ART

In an electric vehicle, since an in-vehicle battery occupies considerable weight and a mounting space, numerous studies have been made on a structure of the in-vehicle battery.

In Patent Literature 1, a case in which a battery is housed is configured with fiber-reinforced plastic, and weight reduction of a battery tray is attempted.

Patent Literature 2 describes a battery box in which strength and rigidity of a battery tray is enhanced by a metal frame-shaped frame.

Patent Literature 3 describes a component for absorbing impact energy, which is disposed on an outside of a battery in a vehicle width direction to protect the battery stored in an electric vehicle.

CITATION LIST

Patent Literature

Patent Literature 1: JP-A-2013-201112
Patent Literature 2: JP-A-2011-124101
Patent Literature 3: JP-A-2020-55504

SUMMARY OF INVENTION

Technical Problem

However, in the case of the battery tray described in Patent Literature 1, the battery tray has a single-layer structure to absorb collision energy, and airtightness of the battery box is lost at the time of collision. As a result, the battery is damaged by rain water or the like, and there is a risk of explosion or the like.

In the case of the battery tray described in Patent Literature 2, when a side surface of the vehicle receives an impact, the metal frame-shaped frame is likely to be deformed by the external force, and there is a risk of damaging the battery.

Since the structural member for impact absorption described in Patent Literature 3 is not fastened to the battery box but to the vehicle body side, structural rigidity of the battery tray and the battery cover cannot be utilized at all.

In view of the problems of the related art, it is an object of the present invention to provide a vehicle structure in which a structural member is fastened together with a battery tray and a battery cover.

Solution to Problem

As a result of intensive studies, the present inventors have found that the above-described problems can be solved by the following means, and have completed the present invention.

1. A vehicle structure disposed at a lower portion of a center of a vehicle body, the vehicle structure comprising a battery cover, a battery tray, and a structural member for absorbing impact energy,
   wherein each of the battery cover and the battery tray is configured with an integrally molded fiber-reinforced plastic,
   the structural member is located outside in a vehicle width direction of at least one of the battery cover and the battery tray, and
   the structural member is fastened together with the battery cover and the battery tray.

2. The vehicle structure according to the above 1, wherein the structural member is fastened together with the battery tray and the battery cover by a stepped bolt.

3. The vehicle structure according to the above 2, wherein the battery cover, the battery tray, and the structural member are stacked in this order and fastened together.

4. The vehicle structure according to the above 2, wherein the structural member, the battery cover, and the battery tray are stacked in this order and fastened together.

5. The vehicle structure according to any one of the above 1 to 4,
   wherein the structural member includes a first vertical wall and a second vertical wall located on an inside of the first vertical wall in the vehicle width direction,
   the first vertical wall and the second vertical wall extend in a front-rear direction of the vehicle body, and
   a minimum thickness of the first vertical wall is smaller than a maximum thickness of the second vertical wall.

6. The vehicle structure according to any one of the above 1 to 5, wherein each of the battery cover and the battery tray is configured with an integrally molded fiber-reinforced plastic by using a sheet molding compound.

7. The vehicle structure according to any one of the above 1 to 6, wherein a cross member is inserted into the battery tray,
   (1) the battery tray includes a first bottom portion, a peripheral wall erected on an outer periphery of the first bottom portion, a first inner wall connected to the first bottom portion, a second inner wall connected to the first bottom portion, and a second bottom portion connected to both the first inner wall and the second inner wall and raised from the first bottom portion,
   (2) the first bottom portion, the peripheral wall, the first inner wall, the second inner wall, and the second bottom portion are configured with an integrally molded fiber-reinforced plastic, and
   (3) a recessed portion extending in the vehicle width direction is formed by the first inner wall, the second inner wall, and the second bottom portion, and the cross member is inserted into at least one location of the recessed portion.

8. The vehicle structure according to the above 7, wherein the cross member is joined to the structural member.

9. The vehicle structure according to the above 7 or 8, wherein an angle formed by the first bottom portion and the first inner wall and an angle formed by the first bottom portion and the second inner wall are 90 degrees or more and 135 degrees or less.

10. The vehicle structure according to the above 7 to 9, wherein discontinuous fibers are continuously dispersed in a boundary area between the first bottom portion and the first inner wall, a boundary area between the first bottom portion and the second inner wall, and a boundary area between the first bottom portion and the peripheral wall.

11. The vehicle structure according to any one of the above 1 to 10, wherein the battery cover includes a rib and has a natural frequency in a primary mode of 25 Hz or more.

12. The vehicle structure according to the above 1, wherein the fiber-reinforced plastic has a specific heat of 0.5 J/kg ° C. or more and 2.0 J/kg ° C. or less and a minimum thickness of 1 to 5 mm.

13. A battery-mounted vehicle body comprising the vehicle structure according to any one of the above 1 to 12 fixed to a vehicle body,
- wherein a relation of the number n1 of fixed points between the structural member and the vehicle body and the number n2 of fixed points between the battery cover and the vehicle body satisfies n1>n2.

14. The vehicle structure according to any one of the above 1 to 13, wherein a lowermost part of the structural member is located at a lower position than a lowermost part of the battery tray.

The vehicle structure according to the above 5,
- wherein an upper end of the first vertical wall of the structural member is above the first bottom portion of the battery tray, and a lower end of the first vertical wall of the structural member is below the first bottom portion of the battery tray.

16. The vehicle structure according to the above 5,
- wherein an upper end of the second vertical wall of the structural member is preferably above the first bottom portion of the battery tray, and a lower end of the second vertical wall of the structural member is preferably below the first bottom portion of the battery tray.

17. The vehicle structure according to claim 14, further comprising a protective wall below the battery tray,
- wherein the protective wall is connected to the structural member.

18. The vehicle structure according to any one of the above 1 to 5, wherein
- the structural member comprises a first vertical wall and a second vertical wall located on an inside of the first vertical wall in the vehicle width direction,
- the first vertical wall and the second vertical wall extend in a front-rear direction of the vehicle body, and
- a strength of the first vertical wall is lower than a strength of the second vertical wall.

Advantageous Effects of Invention

In a vehicle structure of the present invention, when an impact is applied to a side surface of a vehicle, the structural rigidity of a battery tray can be utilized in addition to the structural rigidity of a vehicle body.

BRIEF DESCRIPTION OF DRAWINGS

FIG. 9 is a schematic view illustrating a direction in which a battery tray is easily bent.

DESCRIPTION OF EMBODIMENTS

Figure 1:
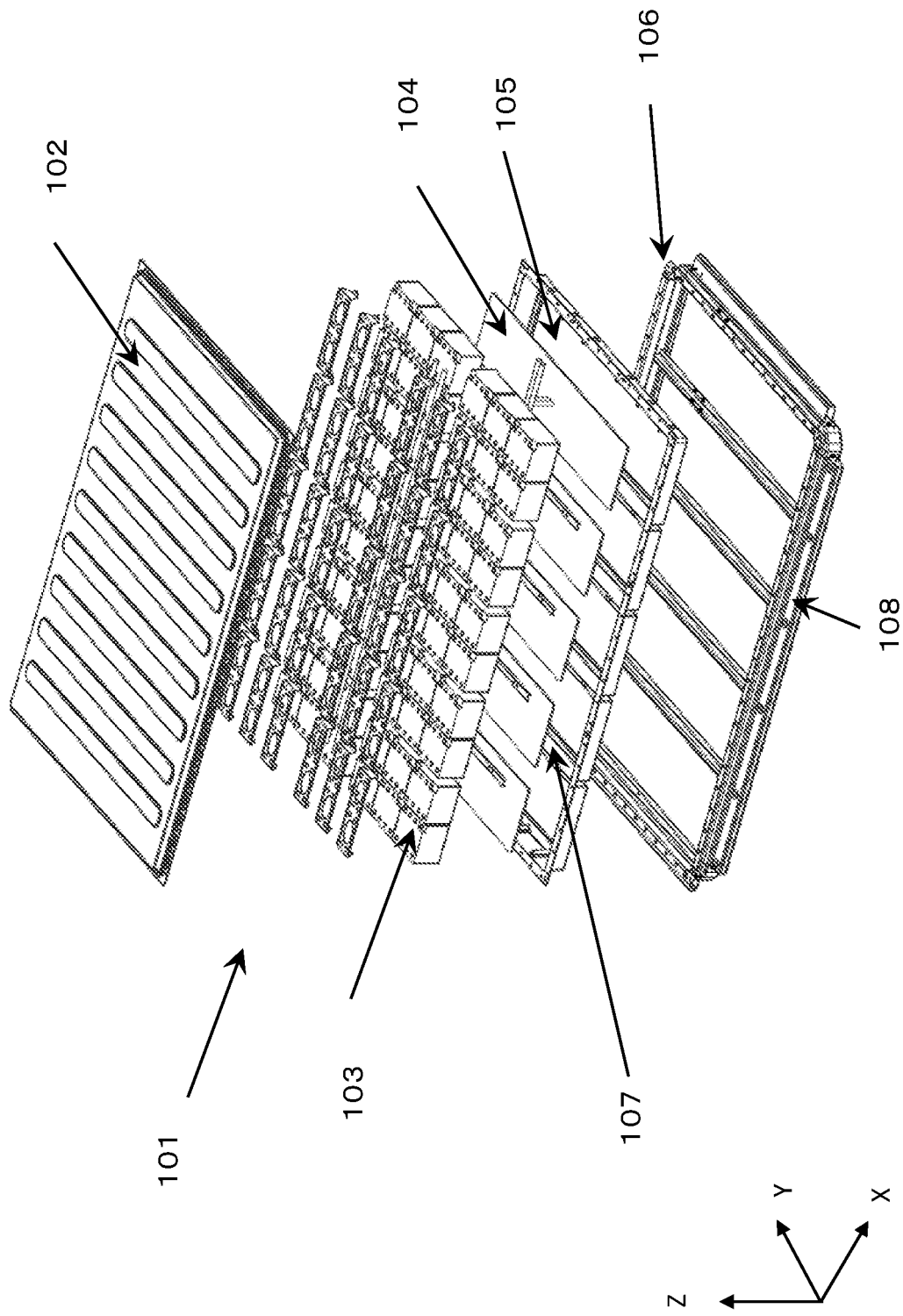
FIG. 1 is a schematic exploded perspective view illustrating an example of a vehicle structure using a battery tray.

Hereinafter, an embodiment of the present invention will be described, but the present invention is not limited thereto. A vehicle structure in the present invention is disposed at a lower portion of a center of a vehicle body, and the vehicle structure includes a battery box including a battery tray and a battery cover, and a structural member for absorbing impact energy. Each of the battery tray and the battery cover is configured with an integrally molded fiber-reinforced plastic.

[Integral Molding]

Here, the integral molding means that the components are continuously molded without a seam and are not molded by joining separate members to each other. Such integral molding can be implemented by producing a fiber-reinforced plastic in one molding, and preferably by press molding. A fiber-reinforced plastic may be produced by integrally molding a sheet molding compound (also may be referred to as SMC). Since a component is formed by integral molding, different components can be processed as one component, and a unit price of the component can be reduced. In addition, the number of assembling steps is reduced, and the cost related to stock can be reduced by reducing the number of components.

It should be noted that each of the battery tray and the battery cover is integrally molded, and the battery tray is not integrally molded with the battery cover. The battery tray and the battery cover are separate bodies.

[Fiber-Reinforced Plastic]

1. Reinforcing Fiber

A reinforcing fiber contained in the fiber-reinforced plastic is not particularly limited, and is preferably one or more reinforcing fibers selected from the group consisting of carbon fibers, glass fibers, aramid fibers, boron fibers, and basalt fibers. The reinforcing fiber is more preferably glass fibers. When the glass fibers are used as the reinforcing fibers, an average fiber diameter of the glass fibers is preferably 1 µm to 50 µm, and more preferably 5 µm to 20 µm. When the average fiber diameter is large, impregnation of a resin into the fibers becomes easy, and when the average fiber diameter is equal to or smaller than an upper limit, moldability and processability are improved.

2. Discontinuous Fiber

The reinforcing fiber preferably contains discontinuous fibers. When the discontinuous fibers are used, formability is improved and it is easy to form a complicated molded product, as compared with a fiber-reinforced plastic using only continuous fibers.

3. Weight Average Fiber Length of Reinforcing Fiber

The weight average fiber length of the reinforcing fibers is preferably 1 mm or more and 100 mm or less. The weight average fiber length is more preferably 1 mm to 70 mm, and still more preferably 1 mm to 50 mm.

In recent years, a size of an in-vehicle battery has increased, and vertical and horizontal dimensions of a battery box are 1 m×1 m, 1.5×1.5 m, or the like. When the weight average fiber length is 1 mm or more, mechanical properties for storing a large battery are easily ensured even when such a large battery box is produced.

In the fiber-reinforced plastic produced by injection molding, a weight average fiber length of the reinforcing fibers is about 0.1 to 0.3 mm Therefore, when a weight average fiber length of the reinforcing fibers is 1 mm or more and 100 mm or less, the fiber-reinforced plastic is preferably produced by press molding.

It is preferred because fluidity is excellent when the weight average fiber length of the reinforcing fibers is 100 mm or less. In the present invention, discontinuous reinforcing fibers having different fiber lengths may be used in combination. In other words, the discontinuous reinforcing fibers used in the present invention may have a single peak or a plurality of peaks in a distribution of the weight average fiber length.

4. Fiber Volume Fraction

The fiber volume fraction Vf of the reinforcing fibers is not particularly limited, and is preferably 20% to 70%, more preferably 25% to 60%, and still more preferably 30% to 55%.

The fiber volume fraction (Vf, unit: volume %) refers to a ratio of a volume of reinforcing fibers to a volume of entire fiber-reinforced plastic including not only the reinforcing fibers and a matrix resin but also other additives.

5. Resin

In the present invention, the kind of the resin is not particularly limited, and a thermosetting resin or a thermoplastic resin is used. When a thermosetting resin is used, the thermosetting resin is preferably an unsaturated polyester-based resin, a vinyl ester-based resin, an epoxy-based resin, or a phenol-based resin.

As the resin, one kind may be used alone, or two or more kinds may be used in combination.

6. Other Agents

A fiber-reinforced plastic used in the present invention may contain additives such as various fibrous or non-fibrous fillers of organic fibers or inorganic fibers, inorganic fillers, flame retardants, UV resistant agents, stabilizers, release agents, pigments, softeners, plasticizers, and surfactants as long as the objects of the present invention are not impaired.

When a thermosetting resin is used, thickeners, curing agents, polymerization initiators, polymerization inhibitors, or the like may be contained.

As the additive, one kind may be used alone, or two or more kinds may be used in combination.

7. Sheet Molding Compound

The fiber-reinforced plastic of the present invention is preferably obtained by molding a sheet molding compound (also may be referred to as SMC) using reinforcing fibers. The sheet molding compound can be easily molded even in a complicated shape such as a battery tray or a battery cover due to its high moldability.

That is, a sheet molding compound is molded to manufacture a fiber-reinforced plastic, and a battery tray having recesses and protrusions can be manufactured. The sheet molding compound has fluidity and formability higher than those of continuous fibers, and can easily produce a rib and a boss.

As the fiber-reinforced plastic using the sheet molding compound (SMC), a sheet molding compound manufactured by Continental Structural Plastics (may be abbreviated as CSP) can be used.

[Minimum Thickness of Fiber-Reinforced Plastic]

In the present invention, the minimum thickness of the fiber-reinforced plastic is preferably 1.0 mm or more and less than 5 mm, more preferably 1.5 mm or more and less than 5 mm, still more preferably 2 mm or more and 5 mm or less, and yet still more preferably 3 mm or more and 5 mm or less. The minimum thickness of 5 mm or less is preferred from the viewpoint of weight reduction of a battery box. When the fiber-reinforced plastic has a minimum thickness of 1.0 mm or more, battery temperature is less likely to be affected by the outside air temperature.

In the case of a battery tray, the minimum thickness of the fiber-reinforced plastic is preferably 2 mm or more and less than 5 mm, and more preferably 3 mm or more and less than 5 mm.

In the case of a battery cover, the minimum thickness of the fiber-reinforced plastic is preferably 1 mm or more and less than 4 mm, and more preferably 1 mm or more and less than 3 mm.

[Specific Heat of Fiber-Reinforced Plastic]

The specific heat of the fiber-reinforced plastic is preferably 0.5 J/kg ° C. or more and 2.0 J/kg ° C. or less. Within this range, the influence of the outside air temperature on the battery is reduced.

Hereinafter, an embodiment of the vehicle structure of the present invention will be described with reference to the drawings.

The vehicle structure shown in the drawing is disposed at the lower portion of the center of the vehicle body, and includes a battery box 101 including a battery tray 105 and a battery cover 102, and a structural member A (108). Each of the battery tray 105 and the battery cover 102 is configured with an integrally molded fiber-reinforced plastic. The structural member A (108) is used for absorbing impact energy. The battery box 101 stores a battery 103.

Further, a cooling mechanism 104 for temperature control may be provided on the battery tray 105.

Figure 6:
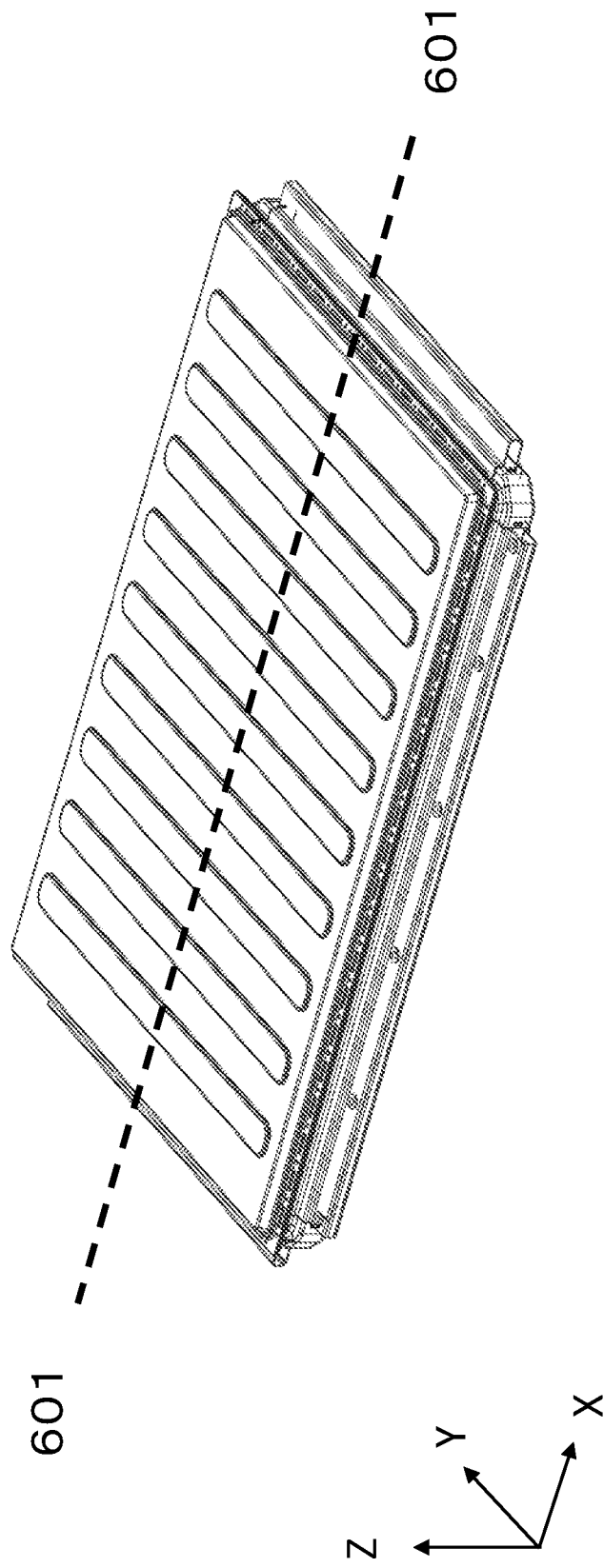
FIG. 6 is a schematic view illustrating an example of a vehicle structure using a battery cover.

The battery cover 102, the battery tray 105, and the structural member A (108) are fastened together. The fastened state is shown in FIG. 6.

When components of the battery box are configured with the fiber-reinforced plastic, an electromagnetic wave shielding layer is attached to the battery box to shield electromagnetic waves generated by the battery. The electromagnetic wave shielding layer can shield the electromagnetic wave radiated from the battery to prevent radiation or leakage to the outside, can ensure sufficient electromagnetic wave shielding properties for the components of the battery box, and for example, can prevent adverse effects of the electromagnetic wave on a control system of the vehicle or a human body.

The electromagnetic wave shielding layer is preferably configured with metal, and more preferably configured with aluminum or an aluminum alloy. The electromagnetic wave shielding layer may be fastened together with the battery cover 102, the battery tray 105, or the structural member A (108).

[Battery Tray and Battery Cover]

The battery 103 is stored in the battery box 101 including the battery tray 105 and the battery cover 102.

[Natural Frequency of Battery Cover in Primary Mode]

Figure 7:
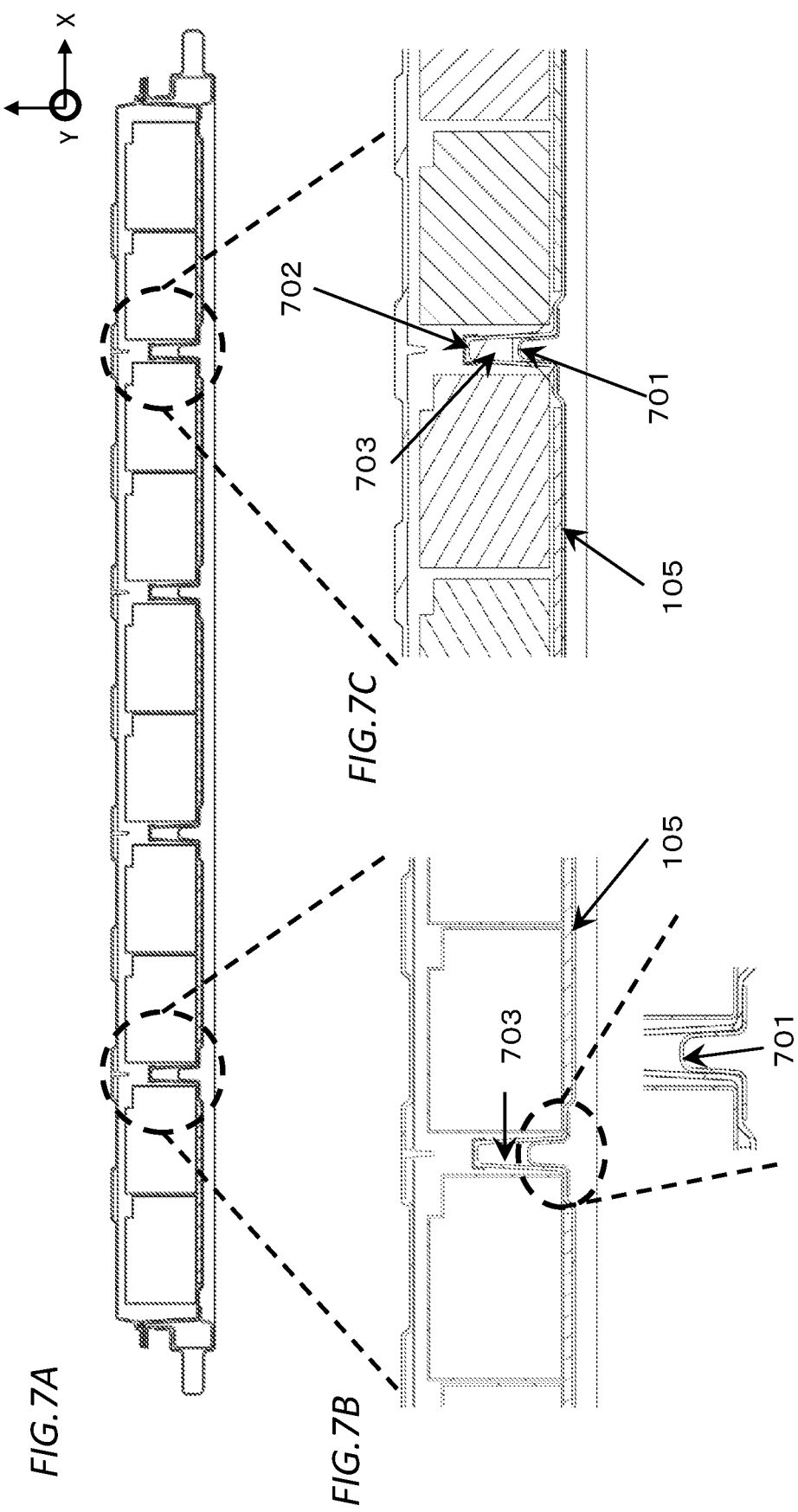
FIG. 7A is a schematic view illustrating a cross section taken along a line 601-601 in FIG. 6.
FIG. 7B is an enlarged schematic view of FIG. 7A such that a cross member can be observed (observation of a position where no rib is provided).
FIG. 7C is an enlarged schematic view of FIG. 7A such that the cross member and the rib can be observed.
Figure 8:
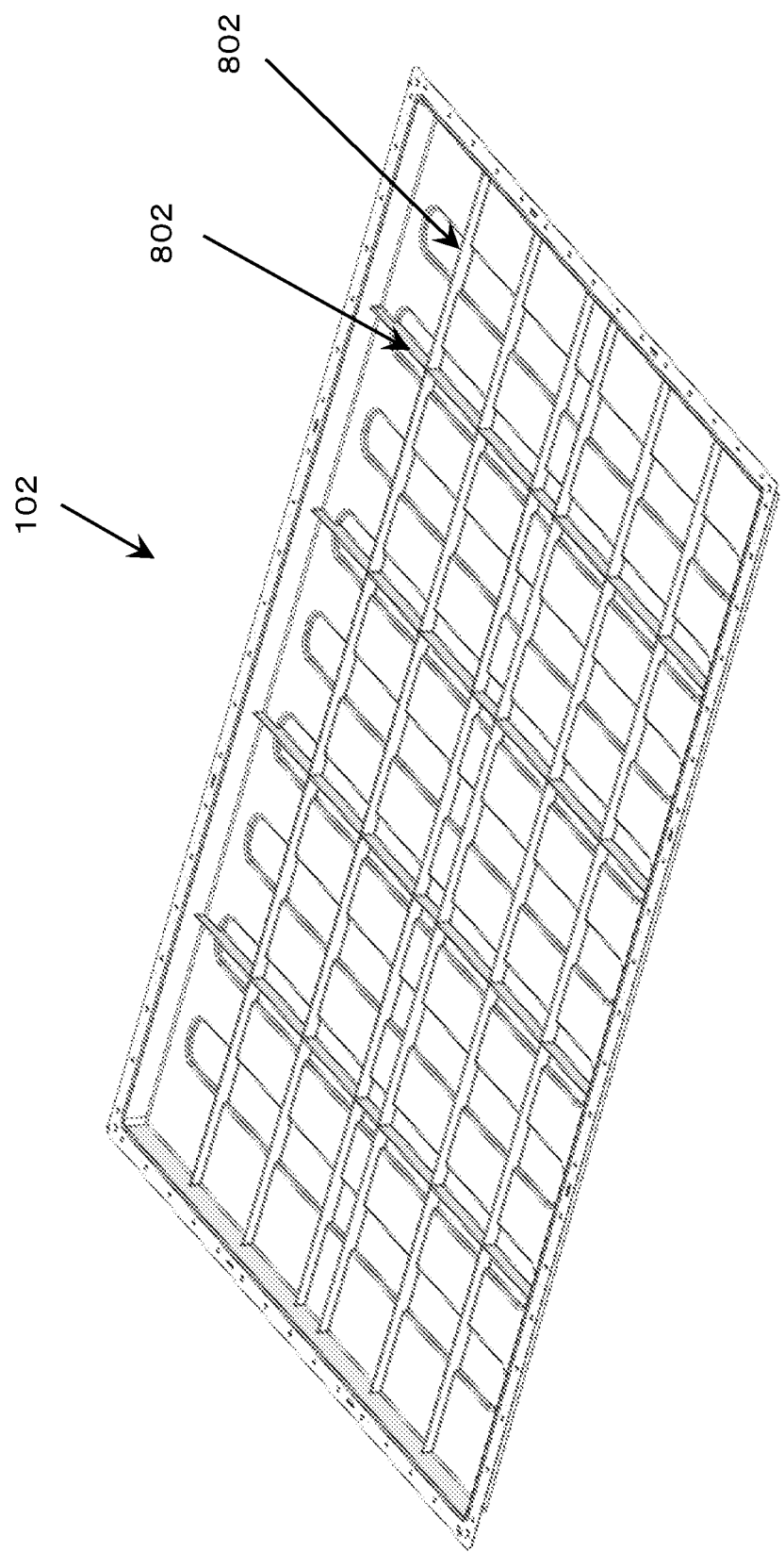
FIG. 8 is a schematic view of an example of a battery cover as viewed from an inside.

The battery cover 102 includes a rib such as a rib 702 shown in FIG. 7C, and preferably has natural frequency in the primary mode of 25 Hz or more. The natural frequency is more preferably 30 Hz or more, still more preferably 35 Hz or more, and yet still more preferably 40 Hz or more. When the battery cover 102 includes ribs, the battery cover 102 becomes an uneven thickness structure. Since the vibration input to the battery cover 102 is often 25 Hz or less, it is preferable to design the battery cover 102 so as not to resonate with the vibration. A cross-sectional shape of the ribs is not particularly limited, and may be a square shape, a rectangle shape, an inverted truncated cone shape, an inverted triangle shape, a semicircular cross-sectional shape, a semi-elliptical cross-sectional shape, a bumpy shape, a mountain shape, or the like. The arrangement structure of the ribs is not particularly limited, and the ribs may be arranged in one direction, in a cross shape, or in an oblique cross shape. The location of the ribs is also not particularly limited, and may be on an outside or an inside of the battery cover 102. It is preferable that the ribs are provided on the inside because a design space of the battery box 101 can be maximized (for example, the design space can be used for wiring between the ribs). FIG. 8 illustrates ribs 802 each having a cross shape and a rectangular cross section, which are provided inside the battery cover 102.

Since the battery tray 105 includes a recessed portion, the natural frequency in the primary mode can be easily set to 25 Hz or more.

[Number of Fixed Points Between Battery Cover and Vehicle Body]

When the natural frequency of the battery cover 102 in the primary mode is less than 25 Hz, it is necessary to fix the battery cover 102 to the vehicle body and the number of fixed points with the vehicle body is increased in order to prevent resonance with the vibration input to the battery cover 102. In other words, when the natural frequency in the primary mode is 25 Hz or more, the number of fixed points for fixing the battery cover 102 to the vehicle body can be reduced in order to prevent resonance with the vibration input to the battery cover 102. In general, the battery cover 102 is fixed by being fastened from an inside of the vehicle body. When the number of fixed points can be reduced, fastening work from the inside of the vehicle body can be reduced.

Figure 12:
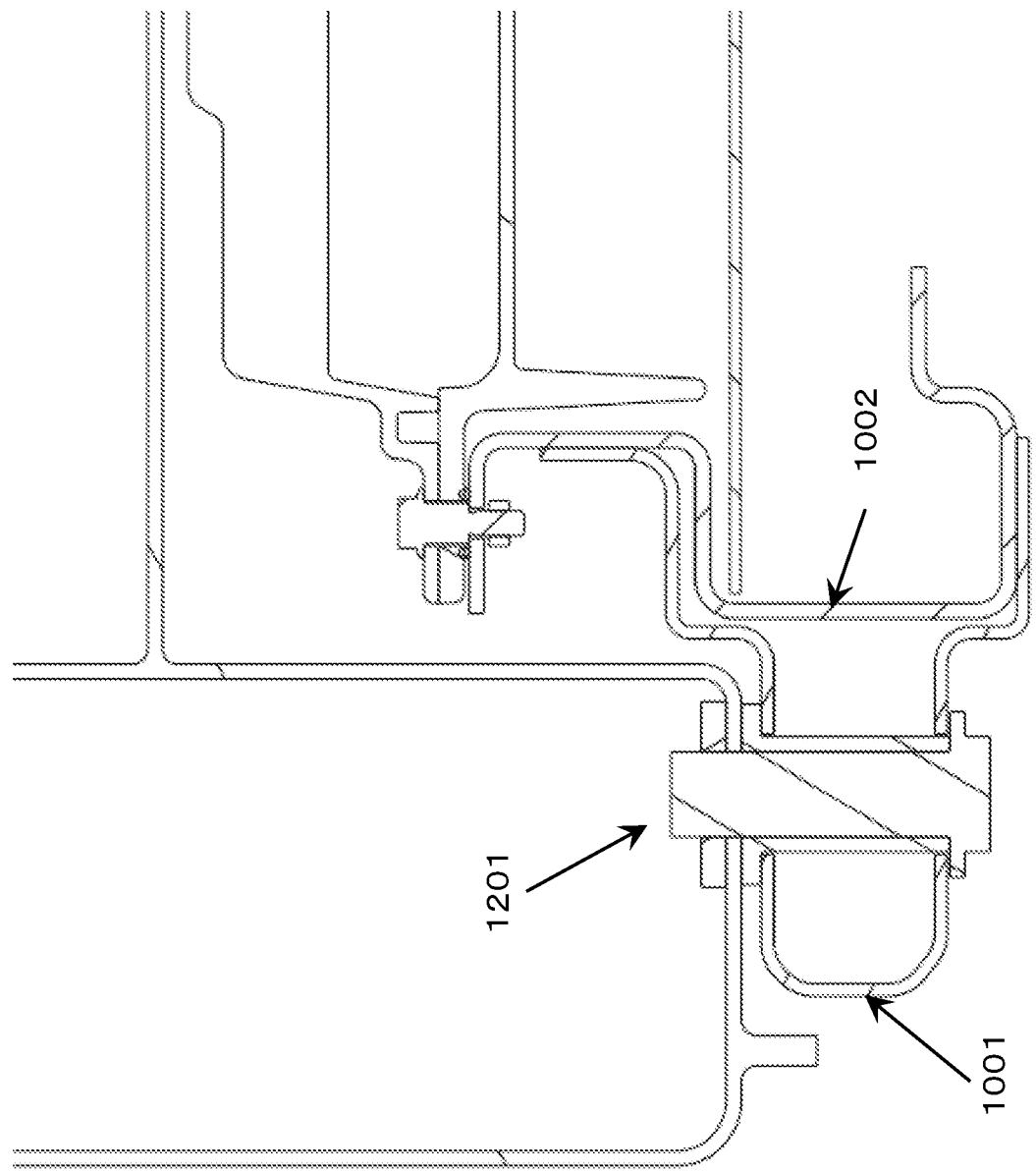
FIG. 12 is a schematic view illustrating an example of a fixing portion for fastening the structural member A to a vehicle.
Figure 13:
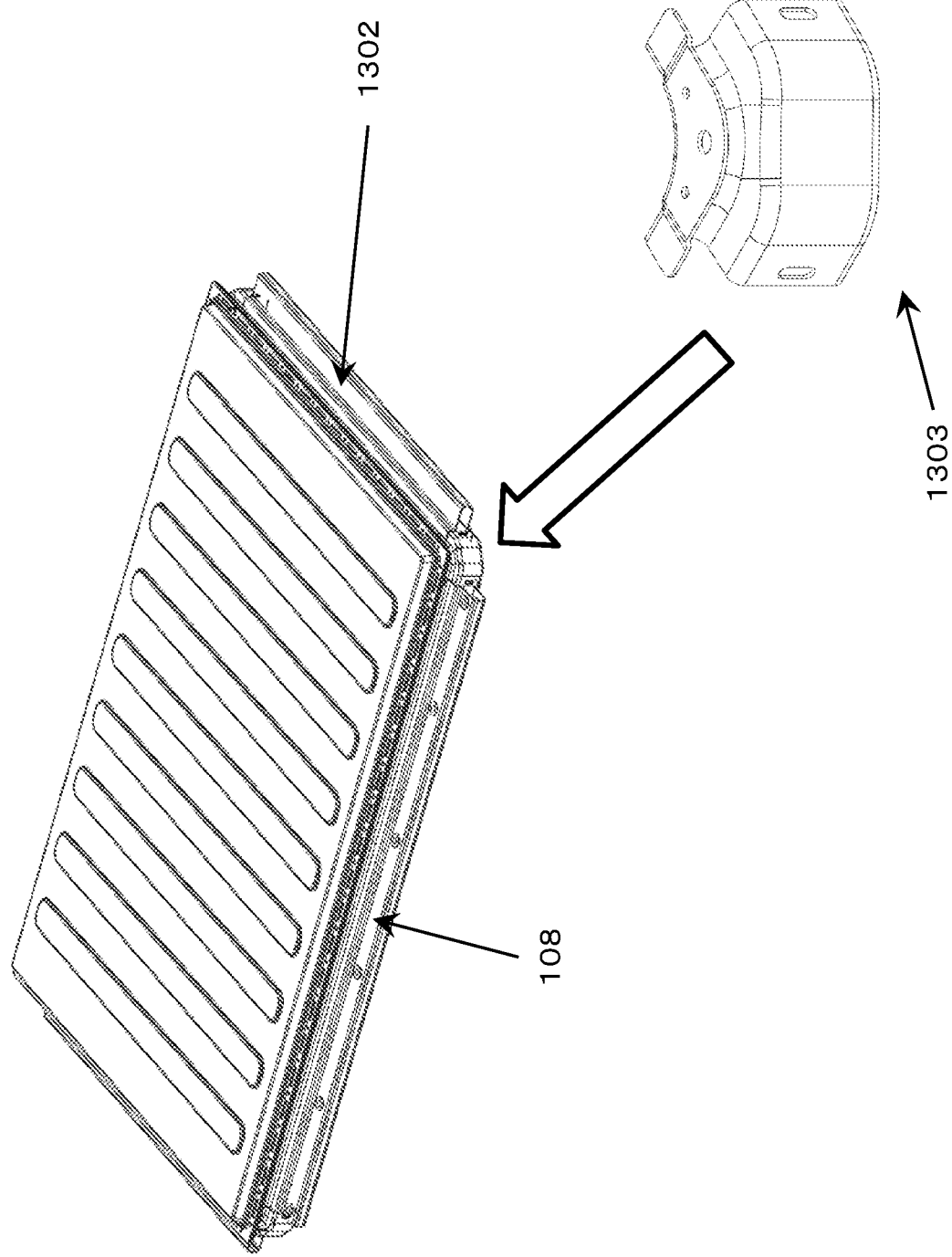
FIG. 13 is a schematic view illustrating a structural member B provided outside the battery cover and the battery tray in a front-rear direction of the vehicle body, and a structural member C provided at a corner portion of the battery cover and the battery tray.

That is, when the vehicle structure of the present invention is fixed to the vehicle body and the vehicle body serves as a battery-mounted vehicle body, it is preferable that a relation between the number n1 of fixed points between the structural member A (108) and the vehicle body and the number n2 of fixed points between the battery cover 102 and the vehicle body satisfies n1>n2. Fixed points between the structural member A (108) and the vehicle body are illustrated in 1201 of FIG. 12.

By fastening the structural member A (108) and the vehicle body, it is possible to reduce the number of fixed points of fixing (mainly fastening) the battery cover 102 to the vehicle body. When the structural member A (108) is fastened to the vehicle body, there is no need to fasten the battery cover 102 from the inside of the vehicle body, and thus the working efficiency is improved.

The specific number n2 of fixed points is preferably 10 or less, more preferably 5 or less, even more preferably 3 or less, and most preferably 0.

Further, when the number of fixed points of the battery box 101 is reduced, the number of fastening holes in the battery box 101 can be reduced. Therefore, the airtightness of the battery box 101 can be easily ensured.

[Battery Tray: General]

The battery tray 105 mounts the battery 103 for driving a vehicle and is used for driving an automobile.

The battery tray 105 includes a first bottom portion 303 and a peripheral wall 205 erected on an outer periphery of the first bottom portion 303. The battery tray 105 further includes a first inner wall 206 connected to the first bottom portion 303, a second inner wall 207 connected to the first bottom portion 303, and a second bottom portion 301 connected to both the first inner wall 206 and the second inner wall 207 and raised from the first bottom portion.

The first bottom portion 303, the peripheral wall 205, the first inner wall 206, the second inner wall 207, and the second bottom portion 301 are configured with an integrally molded fiber-reinforced plastic.

In this manner, since an inner partition wall 107 is formed by the first inner wall 206 and the second inner wall 207, a wall including the reinforcing fibers up to a tip end can be easily manufactured even if the inner dividing wall is formed high from the bottom.

[Battery Tray: Flange]

Figure 4:
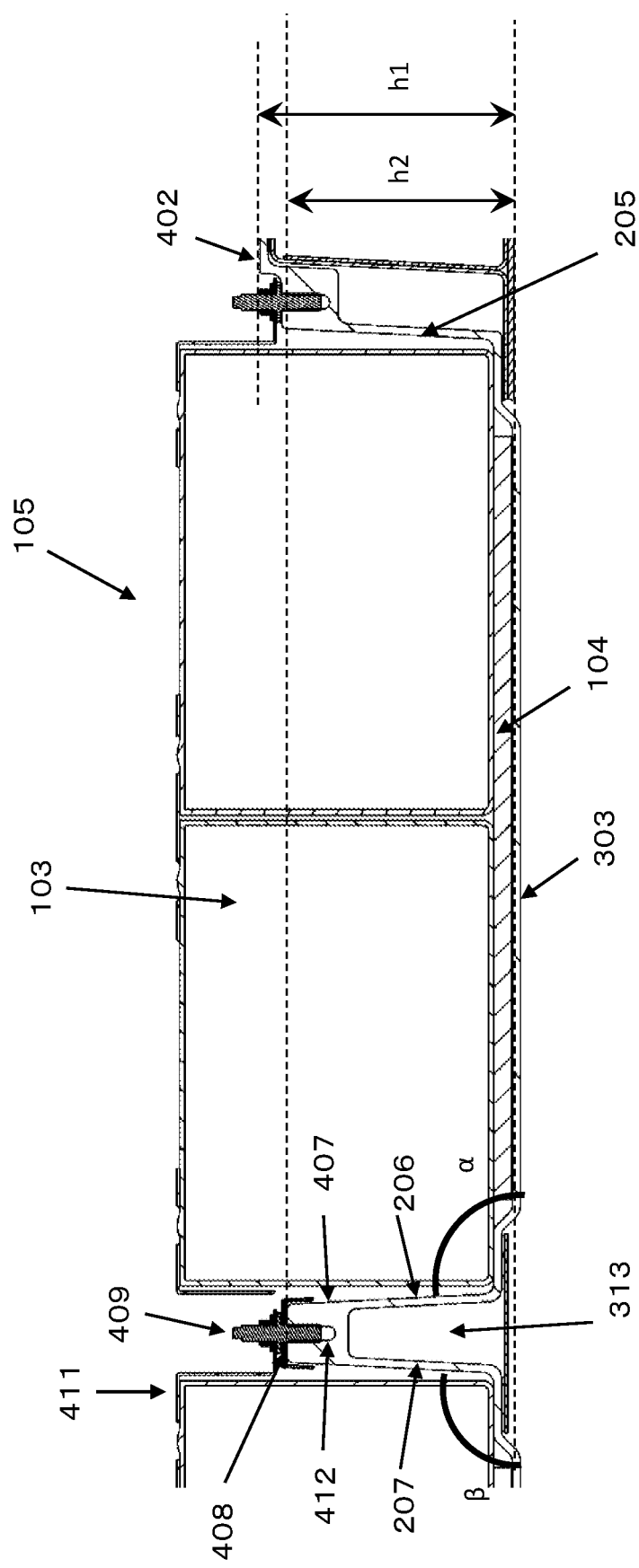
FIG. 4 is a schematic cross-sectional view of an example of the battery tray (a cross section taken along a line 203-203 in FIG. 2, at a position where a stud bolt base is present).

The battery tray 105 includes, for example, a flange 402 illustrated in FIG. 4. The flange of the battery tray 105 is used to fasten the battery cover 102 and the structural member A (108) together.

[Battery Tray: First Bottom Portion]

A lower surface of the first bottom portion 303 is a lowermost surface of the battery tray 105. A battery may be placed on an upper surface of the first bottom portion 303, or the cooling mechanism 104 or a ventilation mechanism may be provided in a space provided between the battery and the first bottom portion. In addition, the first bottom portion does not need to have a completely flat plate shape, and may have a wavy shape like a corrugated shape, or may have a curved surface.

[Battery Tray: Peripheral Wall]

The peripheral wall 205 is erected on the outer periphery of the first bottom portion 303, and is preferably formed continuously with the surfaces of the first bottom portion 303.

[Battery Tray: First Inner Wall and Second Inner Wall]

The first inner wall 206 is connected to the first bottom portion 303. The fiber-reinforced plastic that forms the battery tray is bent between the first inner wall 206 and the first bottom portion 303. The first bottom portion 303 is continuously connected to the first inner wall 206, and the first bottom portion 303 and the first inner wall 206 are integrally molded without a seam.

Similarly, the second inner wall 207 is connected to the first bottom portion 303. The fiber-reinforced plastic that forms the battery tray is bent between the second inner wall 207 and the first bottom portion 303. The first bottom portion 303 is continuously connected to the second inner wall 207, and the first bottom portion 303 and the second inner wall 207 are integrally molded without a seam. When the fiber-reinforced plastic is used, it is possible to easily perform integral molding without a seam.

The first inner wall 206 and the second inner wall 207 are formed by bending the fiber-reinforced plastic that forms the battery tray.

[Battery Tray: Inner Partition Wall]

Figure 2:
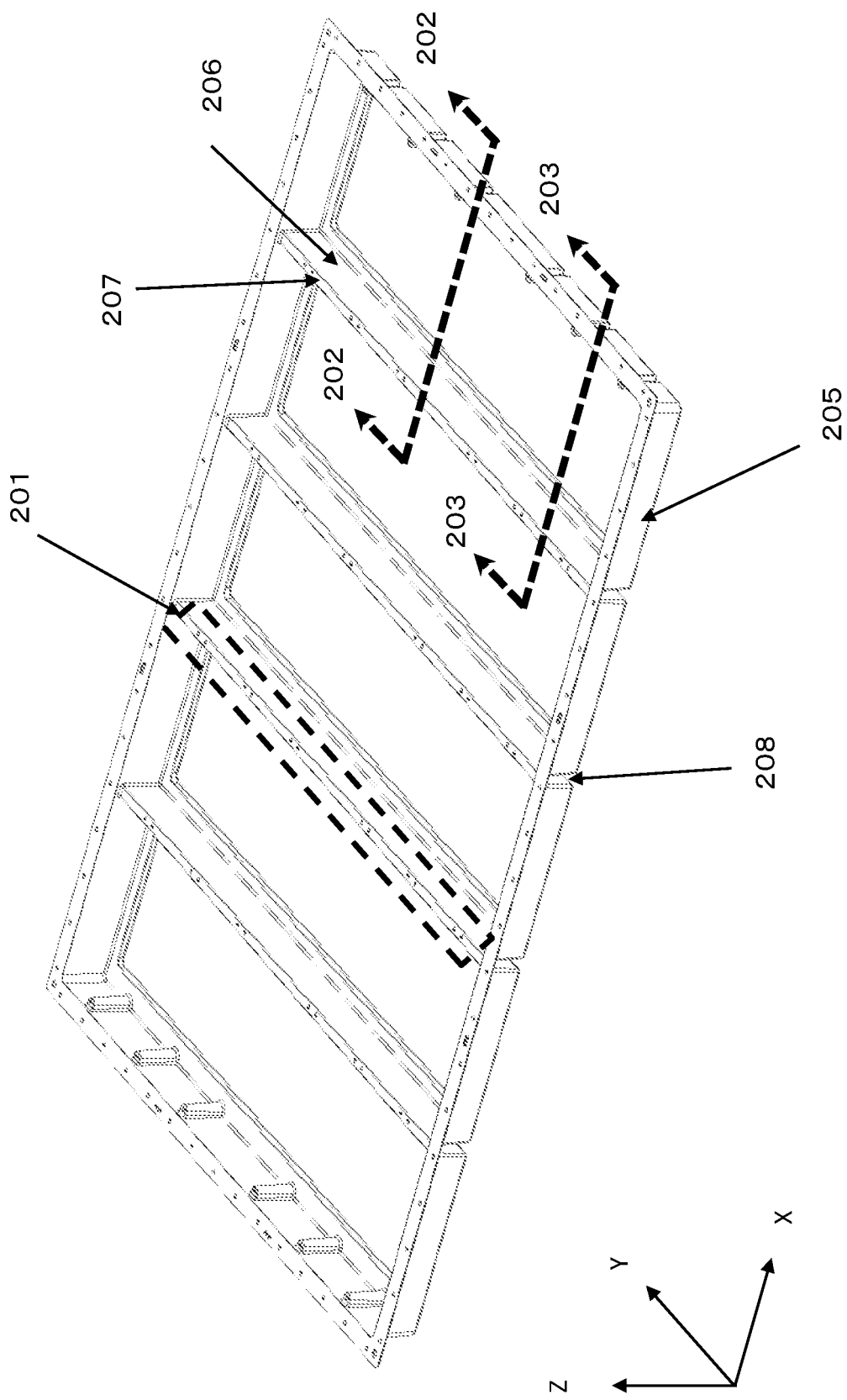
FIG. 2 is a schematic perspective view illustrating an example of a battery tray.

The first inner wall 206 and the second inner wall 207 form the inner partition wall 107 illustrated in FIG. 1, which partitions an inside of the battery tray 105. There may be two or more such inner partition walls 107. In FIGS. 1 and 2, the inner partition wall 107 is formed in a Y-axis direction, and a total of four inner partition walls 107 extend. It is preferable that an X axis in FIGS. 1 and 2 represents an axle direction (a traveling direction of a vehicle) and a Y axis represents a vehicle width direction.

[Battery Tray: Stud Bolt Base]

The battery tray 105 may include a stud bolt base 407 connected to both the first inner wall 206 and the second inner wall 207 and raised from the first bottom portion 303. The stud bolt base 407 is configured with a fiber-reinforced plastic integrally molded with the first bottom portion 303, the peripheral wall 205, the first inner wall 206, the second inner wall 207, and the second bottom portion 301. The stud bolt base 407 is preferably connected to both the first inner wall 206 and the second inner wall 207 and raised from the first bottom portion 303. The first inner wall 206 and the second inner wall 207 may be connected to each other via the stud bolt base 407.

In other words, the battery tray 105 preferably includes the flange 402, the first bottom portion 303, the peripheral wall 205 erected on the outer periphery of the first bottom portion 303, the first inner wall 206 connected to the first bottom portion 303, the second inner wall 207 connected to the first bottom portion 303, and the stud bolt base 407 connected to both the first inner wall 206 and the second inner wall 207 and raised from the first bottom portion 303.

When the stud bolt base 407 is provided in the battery tray 105, it is not necessary to provide the stud bolt base 407 as a separate component. The battery tray 105 that is a component of the battery box 101 is configured with the integrally molded fiber-reinforced plastic, so that the stud bolt base 407 is provided as soon as the molding of fiber-reinforced plastic is completed.

Regarding the battery tray described in Patent Literature 1, large battery brackets are required to be provided on both sides of the battery tray, so that the size of the battery tray is increased. When such a large battery bracket is provided, it is required to increase the width of the vehicle itself in order to install the same amount and number of batteries (the degree of freedom in designing the vehicle is reduced). Since the stud bolt base is provided at some locations on a top of the inner partition wall, a degree of freedom in design of the vehicle is improved.

[Battery Tray: Second Bottom Portion]

The first inner wall 206 and the second inner wall 207 are also connected to each other via the second bottom portion 301, and the second bottom portion 301 is preferably raised by the first inner wall 206 and the second inner wall 207. In other words, the first inner wall 206 and the second inner wall 207 form the inner partition wall 107, and the second bottom portion 301 is a bottom portion of a top of the inner partition wall 107.

Figure 3:
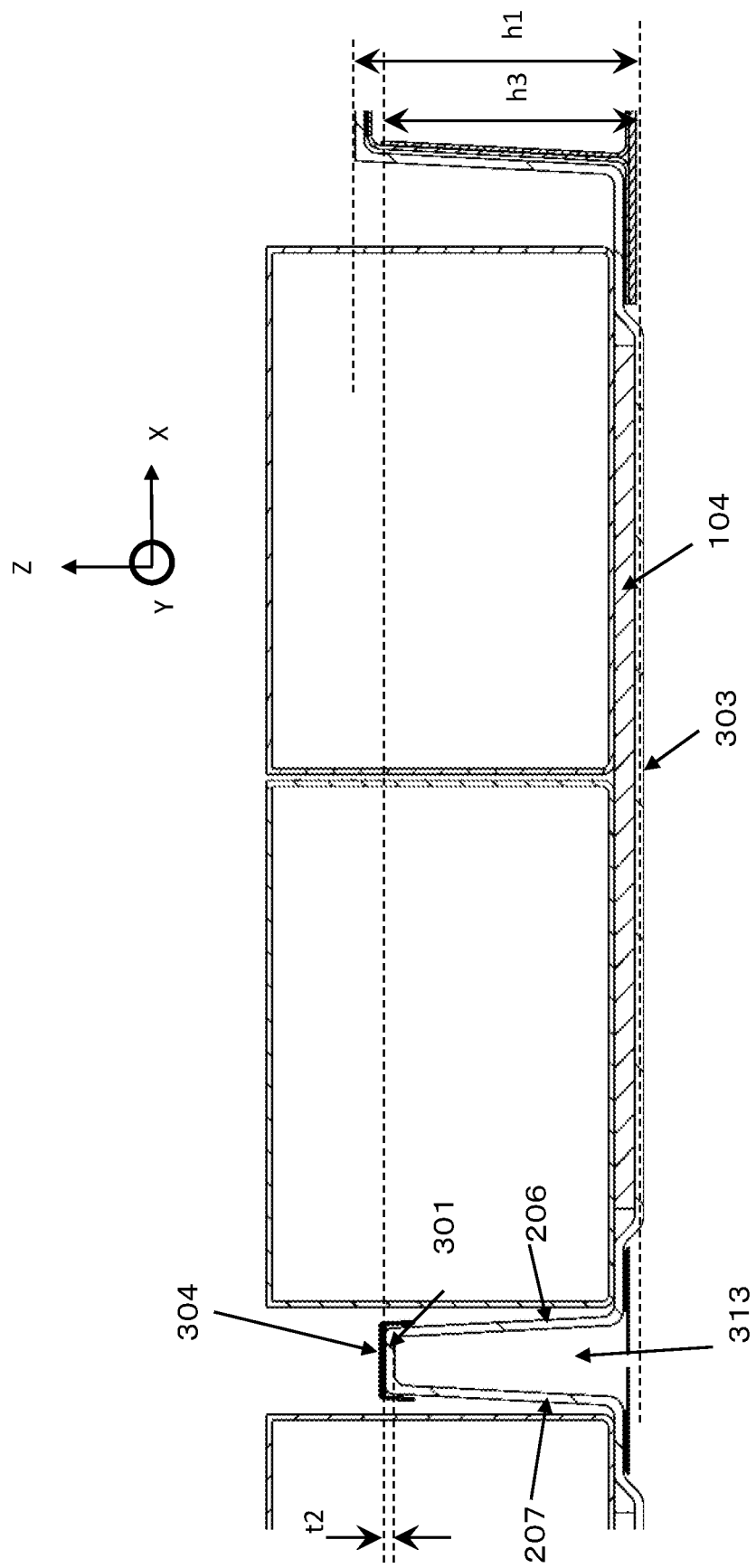
FIG. 3 is a schematic cross-sectional view of an example of the battery tray (a cross section taken along a line 202-202 in FIG. 2, at a position where no stud bolt base is provided).

FIG. 3 is a cross-sectional view taken along a line 202-202 of FIG. 2, in which the second bottom portion 301 is drawn on the bottom portion of the top of the inner partition wall 107 formed by the first inner wall 206 and the second inner wall 207.

FIG. 3 is a cross-sectional view of a position where it is not necessary to provide an insertion hole 412 of the stud bolt, and thus the stud bolt base 407 is not drawn.

An opposite surface of the second bottom portion 301 may be covered with a metal cover 304, and the rigidity may be improved.

[Battery Tray: Height of Second Bottom Portion]

A height h1 from the first bottom portion to the flange and a height h3 from the first bottom portion to the upper surface of the second bottom portion preferably satisfy a relation of $h1 \times 0.3 < h3 < h1 \times 2.0$. The heights h1 and h3 are illustrated in FIG. 3. When the second bottom portion is a curved surface or the like, a length at which h3 is maximum is measured.

The height of the inner partition wall is increased in the case of $h1 \times 0.3 < h3$, and therefore the battery (103, 410) can be stably held. Regarding a lower limit value of h3, $h1 \times < h3$ is more preferable, $h1 \times 0.6 < h3$ is still more preferable, and $h1 \times 0.7 < h3$ is yet still more preferable.

Regarding an upper limit value of h3, $h3 < h1 \times 1.8$ is more preferable, $h3 < h1 \times 1.5$ is still more preferable, $h3 < h1 \times 1.2$ is yet still more preferable, and $h3 < h1 \times 1.0$ is most preferable.

[Battery Tray: Relation Between Second Bottom Portion and Recessed Portion]

The components of the battery box 101 of the present invention include a plurality of recessed portions 208 and form a space 313. In other words, the recessed portion forms the space area 313 surrounded by the first inner wall 206, the second inner wall 207, and the second bottom portion 301 (or the stud bolt base 407).

[Battery Tray: Integral Molding]

The first bottom portion 303, the peripheral wall 205, the first inner wall 206, the second inner wall 207, and the second bottom portion 301 are configured with an integrally molded fiber-reinforced plastic. In a preferred embodiment, the stud bolt base 407 for fixing the battery can also be integrally molded, and further, the flange 402, the first bottom portion 303, the peripheral wall 205, the first inner wall 206, the second inner wall 207, and the stud bolt base 407 are configured with an integrally molded fiber-reinforced plastic.

[Battery Tray: Cross Member]

In the vehicle structure of the present invention, as shown in FIGS. 7B and 7C, a cross member 701 extending in the width direction of the vehicle is preferably inserted into the battery tray 105.

In this case, the battery tray 105 includes, (1) the first bottom portion 303, the peripheral wall 205 erected on the outer periphery of the first bottom portion 303, the first inner wall 206 connected to the first bottom portion 303, the second inner wall 207 connected to the first bottom portion, and the second bottom portion 301 connected to both the first inner wall 206 and the second inner wall 207 and raised from the first bottom portion.

The first bottom portion 303, the peripheral wall 205, the first inner wall 206, the second inner wall 207, and the second bottom portion 301 are configured with an integrally molded fiber-reinforced plastic.

A recessed portion extending in the vehicle width direction is formed by the first inner wall 206, the second inner wall portion 207, and the second bottom portion 301.

A cross member is inserted into at least one location of the recessed portion.

[Cross Member: Arrangement]

Specifically, the recessed portion 208 extending in the vehicle width direction is formed by the first inner wall 206, the second inner wall portion 207, and the second bottom portion 301, and the cross member 701 is preferably inserted into at least one location of the recessed portion 208. The recessed portion 208 forms the space area 313 surrounded by the first inner wall 206, the second inner wall 206, and the second bottom portion 301.

After the cross member 701 is inserted into the recessed portion 208, a space 703 is preferably provided between the cross member 701 and the second bottom portion 301. The space 703 is provided, and thereby it is possible to avoid a striking noise caused by the cross member 701 and the battery tray 105.

It is preferable that a plurality of the cross members 701 exist, and it is more preferable that the cross members 701 are inserted into two or more locations of the recessed portion 208 extending in the vehicle width direction and formed by the first inner wall 206, the second inner wall 207, and the second bottom portion 301. It is more preferable that the cross members are inserted into all of the recessed portions 208.

The cross member 701 preferably extends in the vehicle width direction of the battery tray 105, and as illustrated in FIG. 2, may extend from an end of the battery tray 105 in the vehicle width direction to the opposite end.

[Cross Member: Shape]

The shape of the cross member 701 is not particularly limited, and when a cross section of the cross member 701 is observed from the vehicle width direction (the Y-axis direction in FIG. 2), the cross section may have a T-shape, an L-shape, or a combination thereof. The cross member 701 is preferably bent in a protruding shape along the recessed portion 208 formed by the first inner wall 206, the second inner wall 207, and the second bottom portion 301 so as to extend in the vehicle width direction. In other words, when a cross section of the vehicle structure is observed in the vehicle side surface direction, it is preferable that the cross member is bent so as to form an upward protruding shape, and is inserted into the recessed portion 208. FIGS. 7B and 7C illustrate a bent cross member 701. The cross member 701 is preferably formed by pressing and bending a flat metal plate to have a protruding shape along the recessed portion 208. Here, "along the recessed portion" means that it is not necessary to be completely along the recessed portion, and may be substantially along the recessed portion.

When the cross section of the vehicle structure is observed from the vehicle width direction, it is preferable to form a closed cross section structure 703 as illustrated in FIGS. 7B and 7C by the first inner wall 206, the second inner wall 207, the second bottom portion 301, and the cross member 701. In order to avoid the striking noise between the cross member 701 and the second bottom portion 301, it is preferable to set the height of the protruding shape of the cross member 701 to such a degree that the cross member 701 does not come into contact with the second bottom portion 301.

[Cross Member: Fitting]

It is preferable that the cross member 701 extends in the vehicle width direction and is fitted into the recessed portion 208. In this case, the cross member 701 preferably has a protruding shape as illustrated in FIGS. 7B and 7C. That is, it is preferable that the protruding portion of the cross member 701 is fitted with the recessed portion 208 extending in the vehicle width direction and formed by the first inner wall 206, the second inner wall 207, and the second bottom portion 301.

[Cross Member: Joining]

The cross member 701 is preferably bonded to the first bottom portion 303, and may be bonded to the first bottom portion 303 with an adhesive. In the case of adhesion, it is not necessary to form a hole in the battery tray 105 and airtightness is improved, as compared with the case of fastening.

[Cross Member: Material]

The cross member 701 is preferably a metal or a fiber-reinforced composite material. When the fiber-reinforced composite material reinforced with continuous fibers is used, fibers are preferably oriented in the vehicle width direction (the Y-axis direction in FIG. 2). The metal may be an alloy.

[Cross Member: Thickness]

A thickness of the cross member 701 is preferably 0.5 mm or more and 6.0 mm or less, more preferably 1.0 mm or more and 5.0 mm or less, and still more preferably 1.0 mm or more and 4.0 mm or less.

[Effects of Cross Member Arrangement]

The battery tray 105 includes the recessed portion 208, and the recessed portion 208 forms the space area 313 surrounded by the first inner wall 206, the second inner wall 207, and the second bottom portion 301. Since the recessed portion 208 is provided, the battery tray 105 is easily bent in the up-down direction. More specifically, the bending in the up-down direction is a bending in a direction of an arrow 901 in FIG. 9, and is a bending of an end portion of the battery tray 105 in a vehicle front-rear direction.

The cross member 701 is inserted into the recessed portion 208 of the battery tray 105 and the first bottom portion 303 is joined to the cross member 701, thereby controlling bending in the up-down direction (the direction of the arrow 901 in FIG. 9) due to vibration. When the cross member 701 extends in the vehicle width direction and is fitted and joined to the recessed portion 208, the bending of the cross member 701 can be further controlled.

[Rib of Recessed Portion of Battery Tray]

In the vehicle structure of the present invention, it is preferable that a rib 702 integrally formed with the battery tray 105 is provided in at least one location of the recessed portion 208 as illustrated in FIG. 7C. In other words, it is preferable that the rib 702 is provided in at least one location of an extending recessed portion 208 among recessed portions 208 extending in the vehicle width direction and formed by the first inner wall 206, the second inner wall 207, and the second bottom portion 301. It is more preferable that a plurality of ribs 702 are provided intermittently in the extending direction in the extending recessed portion 208. FIG. 7C depicts a portion where the rib 702 is present in the recessed portion of the battery tray 105, whereas FIG. 7B depicts a portion where the rib 702 is absent in the recessed portion of the battery tray 105.

A thickness of the rib 702 in the recessed portion 208 of the battery tray 105 is preferably 1 mm or more and 4 mm or less, and more preferably 2.5 mm or more and 3 mm or less. A height of the rib 702 is preferably 10 mm or more and 30 mm or less. The thickness of the rib 702 is a thickness in the Y-axis direction in FIGS. 7A to 7C, and the height of the rib 702 is a height in the Z-axis direction in FIGS. 7A to 7C.

The rib 702 is provided in the recessed portion 208 of the battery tray 105, and thereby bending in the up-down direction (the direction of the arrow 901 in FIG. 9) due to vibration can be controlled.

[Natural Frequency of Battery Tray in Primary Mode]

The natural frequency of the battery tray 105 in the primary mode is preferably 25 Hz or more. In general, since the natural frequency of the vehicle body is 25 Hz or less, it is preferable to design the battery tray 105 so as not to resonate with the vehicle body. The natural frequency of the battery tray 105 in the primary mode is more preferably 30 Hz or more, still more preferably 35 Hz or more, and yet still more preferably 40 Hz or more.

More specifically, it is preferable that the rib 702 integrally molded with the battery tray 105 is provided in at least one location of the recessed portion 208, and thus the natural frequency of the battery tray 105 in the primary mode is 25 Hz or more. The battery tray 105 includes the recessed portion 208, so that the natural frequency in the primary mode can be easily 25 Hz or more. Alternatively, the rib 702 is further provided in the recessed portion 208, so that the natural frequency of the battery tray 105 in the primary mode can be more easily 25 Hz or more.

It is preferable that the rib 702 and the cross member 701 do not come into contact with each other and there is a space therebetween. Since the rib 702 and the cross member 701 do not come into contact with each other, it is possible to avoid the striking noise between the rib 702 and the cross member 701.

Focusing only on vibration control, there is no problem even if the cross member 701 is absent. Therefore, the following invention is described as the battery tray 105 excluding the cross member 701 from the vehicle structure of the present invention.

[Battery Tray Provided with Rib]

A battery tray is the battery tray 105 disposed at a lower portion of a center of a vehicle body, (1) The battery tray 105 includes the first bottom portion 303, the peripheral wall 205 erected on an outer periphery of the first bottom portion 303, the first inner wall 206 connected to the first bottom portion 303, the second inner wall 207 connected to the first bottom portion 303, and the second bottom portion 301 connected to both the first inner wall 206 and the second inner wall 207 and raised from the first bottom portion 303;

(2) The first bottom portion 303, the peripheral wall 205, the first inner wall 206, the second inner wall 207, and the second bottom portion 301 are configured with an integrally molded fiber-reinforced plastic;

(3) The recessed portion 208 extending in the vehicle width direction is formed by the first inner wall 206, the second inner wall portion 207, and the second bottom portion 301; and (4) The rib integrally molded with the battery tray 105 is provided in at least one location of the recessed portion 208.

[Joining of Cross Member and Structural Member A]

The cross member 701 is preferably joined to the structural member A (108), and the joining is more preferably welding. The cross member 701 and the structural member A (108) are joined, and thereby not only the structural member A (108) but also the cross member 701 can contribute to absorption of collision energy when collision energy is applied to a side surface of the vehicle. The structural members A (108) are provided on both sides of the vehicle because the structural members A (108) are located outside the battery cover 102 and the battery tray 105 in the vehicle width direction. The structural member is joined to the cross member 701, and thereby not only a structural member A (108) on the side subjected to impact but also a structural member A (108) on the side opposite to the side subjected to the impact can contribute to absorption of impact energy.

[Battery Tray: Angle]

An angle formed by the first bottom portion 303 and the first inner wall 206 is illustrated by α in FIG. 4. An angle formed by the first bottom portion 303 and the second inner wall 207 is illustrated by β in FIG. 4.

The angle α formed by the first bottom portion 303 and the first inner wall 206 and the angle β formed by the first bottom portion 303 and the second inner wall 207 are preferably degrees or more and 135 degrees or less. When the angles α and β are 90 degrees or more, it is easy to take out the battery tray from a molding die during molding. On the other hand, when the angles α and β are 135 degrees or less, the first inner wall 206 and the second inner wall 207 can easily fit a shape of the battery 103 even when the shape of the battery 103 is a rectangular parallelepiped or a cube.

In other words, when the angle α formed by the first bottom portion 303 and the first inner wall 206 and the angle β formed by the first bottom portion 303 and the second inner wall 207 are 90 degrees or more and 135 degrees or less, a size of the battery 103 can be increased with respect to the battery tray 105 per unit volume.

The angle α formed by the first bottom portion 303 and the first inner wall 206 and the angle β formed by the first bottom portion 303 and the second inner wall 207 are more preferably 90 degrees or more and 120 degrees or less, and still more preferably 90 degrees or more and 100 degrees or less.

In order to measure the angle α formed by the first bottom portion 303 and the first inner wall 206 and the angle β formed by the first bottom portion 303 and the second inner wall 207, a cross section of the battery tray 105 may be observed. The direction of cross-section observation is preferably a direction perpendicular to the first inner wall 206 or the second inner wall 207 (for example, cross-section observation in FIG. 4).

When the first bottom portion 303, the first inner wall 206, or the second inner wall 207 has a curved shape during the cross-section observation, a tangent line is drawn to the curve to measure an angle with the tangent line, and a maximum angle and a minimum angle are averaged to calculate the angle α or the angle (3.

[Battery Tray: Stud Bolt and Stud Bolt Base]

The battery tray 105 of the present invention preferably includes, on the stud bolt base 407, a stud bolt 409 for attaching a battery bracket. The first inner wall 206 and the second inner wall 207 are connected to each other via the stud bolt base 407. In other words, it is preferable that the stud bolt base 407 is provided at a location on the top of the inner partition wall 208.

In addition, the stud bolt base 407 may include a non-penetrating insertion hole 412, and the stud bolt 409 may be inserted into the insertion hole 412.

The stud bolt 409 is a bolt in which screw portions are formed at both ends, and one end of the stud bolt 409 is screwed into the insertion hole of the stud bolt base 407. A battery bracket 411 for fixing a battery is fastened to an opposite side. A shape of the stud bolt 409 is not particularly limited.

Figure 5:
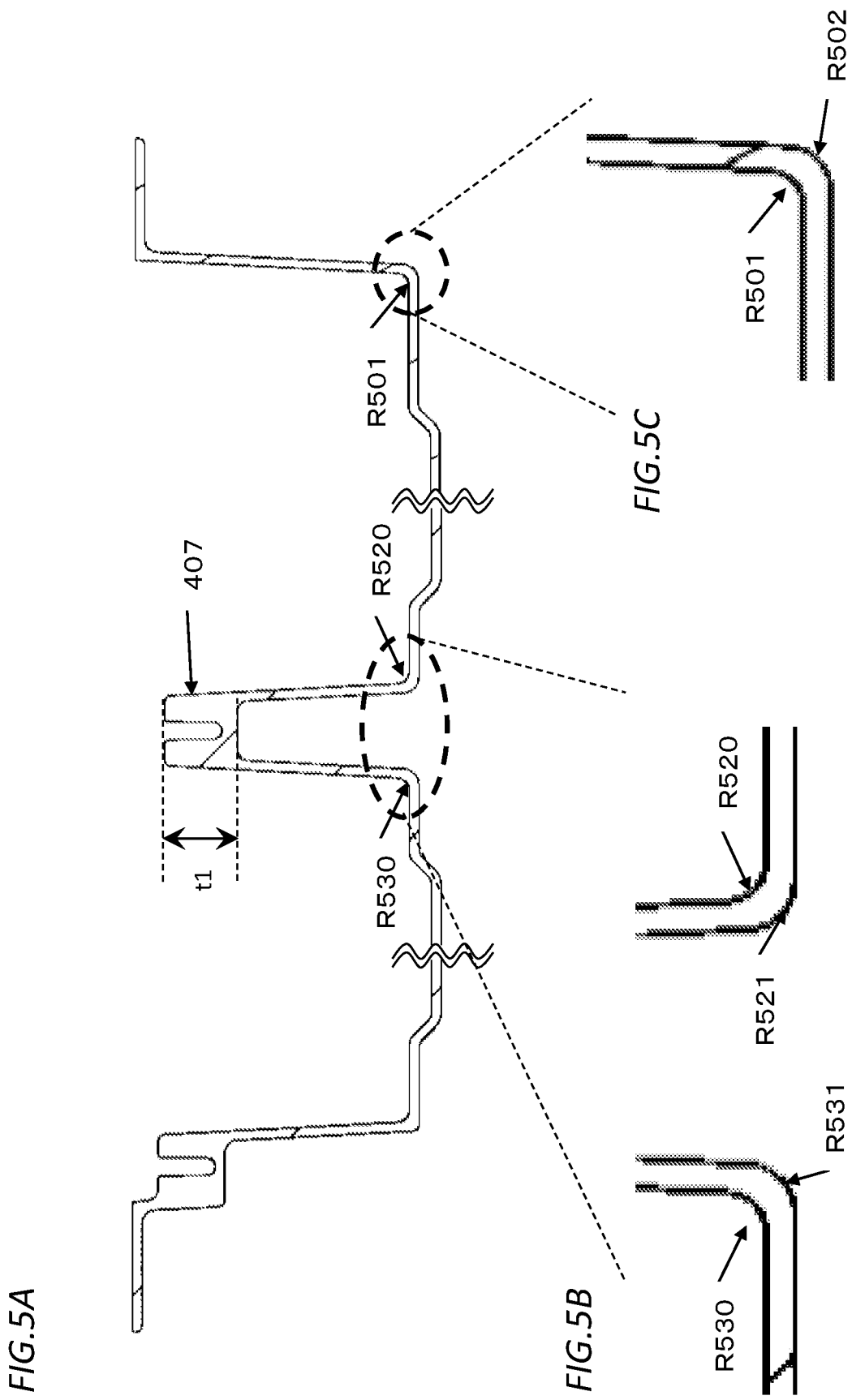
FIG. 5A is a schematic cross-sectional view of an example of a battery tray.
FIG. 5B is an enlarged view of a boundary area between a first bottom portion 303 and a first inner wall 206 and a boundary area between the first bottom portion 303 and a second inner wall 207 in FIG. 5A.
FIG. 5C is an enlarged view of a boundary area between the first bottom portion 303 and a peripheral wall 205 in FIG. 5A.

A thickness t1 of the stud bolt base 407 illustrated in FIG. 5A and a thickness t2 of the second bottom portion 301 illustrated in FIG. 3 preferably satisfy t2<t1. In other words, it is preferable that a thickness of a top portion 201 of the inner partition wall 208 formed by the first inner wall 206 and the second inner wall 207 contributes to form an uneven thickness structure toward the Y-axis direction (vehicle width direction). The top portion 201 is preferably a repeated structure of the stud bolt base 407 and the second bottom portion 301. The thickness t2 of the second bottom portion is designed to be smaller than the thickness t1 (also referred to as a wall thickness) of the stud bolt base, so that the weight of the battery tray 105 can be reduced. It is more preferable to satisfy t2×0.8<t1, and it is still more preferable to satisfy t2×0.5<t1.

The flange 402, the first bottom portion 303, the peripheral wall 205, the first inner wall 206, the second inner wall 207, the stud bolt base 407, and the second bottom portion 301 are configured with an integrally molded fiber-reinforced plastic.

[Battery Tray: Through Hole for Fixing Battery]

In the case of the battery tray according to the related art, it is necessary to provide a through hole in a battery tray and fix a battery bracket to a battery tray in order to fasten a battery to the battery tray.

In a preferred embodiment of the present invention, the stud bolt base 407 is configured with a fiber-reinforced plastic integrally molded with the battery tray 105, and is an uneven thickness structure having a thickness. That is, it is possible not to provide a through hole for fixing the battery 103 in the first inner wall 206, the second inner wall 207, the first bottom portion 303, and the stud bolt base 407. Such a through hole is not provided, so that the sealability of the battery box 101 can be improved, the humidity in the battery box 101 can be stabilized, and the life of the battery can be extended. In addition, it is preferable that a through hole for fixing the battery 103 is not provided in the peripheral wall 205.

[Battery Tray: Height of Stud Bolt Base]

A height h1 from the first bottom portion 303 to the flange 402 and a height h2 from the first bottom portion 303 to an upper surface of the stud bolt base 407 preferably satisfy h1×0.3<h2<h1×2.0.

Since the first bottom portion 303 has a thickness, the height h1 is measured with reference to a vertical center of the first bottom portion 303. When the first bottom portion 303 has a wavy shape like a corrugated shape or has a curved surface, a length at which h2 is maximum is measured.

The heights h1 and h2 are illustrated in FIG. 4.

When h1×0.3<h2 is satisfied, a position of the stud bolt base 407 is higher than the first bottom portion 303, so that a position of the stud bolt 409 for attaching the battery bracket 411 can be higher. As a result, a fixing position of the battery bracket 411 for fixing the battery is raised, so that the length of the battery bracket 411 can be reduced. Since the battery bracket 411 is generally configured with metal such as aluminum, it is possible to contribute to weight reduction by reducing the length of the battery bracket 411.

Regarding a lower limit value of h2, h1×0.5<h2 is more preferable, h1×0.6<h2 is still more preferable, and h1×0.7<h2 is yet still more preferable.

Regarding an upper limit value of h2, h2<h1×1.8 is more preferable, h2<h1×1.5 is still more preferable, h2<h1×1.2 is yet still more preferable, and h2<h1×1.0 is most preferable.

When h1×0.3<h2<h1×2.0 is satisfied, the space area 313 surrounded by the first inner wall 206, the second inner wall 207, and the stud bolt base 407 becomes large as illustrated in FIG. 4. When the space area 313 is large, the cross member 701 can be easily inserted even if the stud bolt base 407 is provided.

A relation between the height h2 from the first bottom portion 303 to the upper surface of the stud bolt base 407 and a height h3 from the first bottom portion 303 to an upper surface of the second bottom portion 301 is preferably h2×0.8<h3<h1×1.2, more preferably h2×0.9<h3<h1×1.1, and still more preferably h2=h3.

[Battery Tray: Rib for Fixing Battery, Boss]

A rib or a boss for fixing the battery 103 is preferably provided on the upper surface of the first bottom portion 303 of the battery tray 105. The upper surface of the first bottom portion is a surface, on which a battery is placed, of the battery tray 105. A lower surface is an opposite surface of the upper surface. It is preferable that the rib or the boss fixes not only the battery but also the wires and the cooling mechanism 104.

Here, the term "fixing" refers to inhibiting movement of the battery, and does not mean complete fixing.

A relation between a height hr of the rib and a height hb of the battery is preferably hb×0.3<hr, and more preferably hb×0.5<hr. More specifically, the height hr of the rib is preferably 20 to 70 mm, more preferably 30 to 60 mm, and still more preferably 40 to 50 mm Within this range, the rigidity of the battery tray 105 can also be improved.

In addition, it is preferable that the rib or the boss for fixing the battery is integrally molded by a fiber-reinforced plastic. The rib or the boss is provided by integral molding with the fiber-reinforced plastic, so that the fixing of the battery can be easily reinforced.

[Battery Tray: Shapes of First Inner Wall and Second Inner Wall]

1. Shape Following Battery Shape

At least one of the first inner wall 206 and the second inner wall 207 preferably has a shape following the battery shape. It is more preferable that the first inner wall 206 and the second inner wall 207 have a shape following the battery shape. In other words, it is more preferable that the inner partition wall 208 has a shape following the battery shape.

The shape following the battery shape means that the shape of the first inner wall 206 or the second inner wall 207 is designed along the shape of the battery. For example, when the battery 103 is a cube or a rectangular parallelepiped, the first inner wall 206 or the second inner wall 207 is a linear wall.

A first inner wall and a second inner wall may be provided for one battery to follow the shape of the battery (to follow the periphery of the battery). It is preferable because an inner partition wall (formed by the first inner wall and the second inner wall) is provided for each battery, and thereby other batteries are not affected even if a problem such as combustion occurs in one battery. In FIG. 2, the first inner wall (206) and the second inner wall (207) are illustrated only in the vehicle width direction (the Y-axis direction in FIG. 2), but may extend in the traveling direction (the X-axis direction in FIG. 2).

2. Attachment to Lower Portion of Vehicle Body

It is preferable that the battery tray 105 in the present invention is attached to a lower portion of a vehicle body of an electric vehicle, and includes the first inner wall 206 and the second inner wall 207 along the vehicle width direction. With this design, the cross member can be easily installed in the vehicle width direction.

Here, the vehicle width direction is, for example, the Y direction in FIG. 1, and is the vehicle width direction. The left-right direction of the vehicle body is also referred to as the vehicle width direction. For example, in FIG. 1, the inner partition wall 107, which is the first inner wall and the second inner wall, extends in the vehicle width direction.

[Battery Tray: Dispersion of Discontinuous Fibers in Boundary Area]

It is preferable that discontinuous fibers are continuously dispersed in a boundary area between the first bottom portion 303 and the first inner wall 206, a boundary area between the first bottom portion 303 and the second inner wall 207, and a boundary area between the first bottom portion 303 and the peripheral wall 205.

Since the first bottom portion 303, the peripheral wall 205, the first inner wall 206, and the second inner wall 207 are formed of the integrally molded fiber-reinforced plastic, the discontinuous fibers can be easily and continuously dispersed in the boundary area.

The sentence "the reinforcing fibers are continuously dispersed in the boundary area" means that the reinforcing fibers may be continuously dispersed in at least a part of the boundary area, and is not required to be continuously dispersed in the entire boundary area.

When the reinforcing fibers are continuously dispersed in an in-plane direction in the boundary area, the mechanical properties of the boundary area are improved as compared with that in the related art.

When a partition wall corresponding to the first inner wall 206 or the second inner wall 207 is attached as a separate component without integrally molding the components of the battery box 101, it is necessary to fasten the partition wall to the first bottom portion 303. However, when an inner partition wall is attached as a separate component without being integrally molded, a fastening force with the first bottom portion 303 is inevitably reduced, and the fastening force becomes unstable.

[Battery Tray: Radius of Curvature of Inner Corner Portion]

It is preferable to form an inner corner portion having a radius of curvature of 1 mm or more and 10 mm or less in a boundary area between the first bottom portion 303 and the peripheral wall 205. The radius of curvature is more preferably 1 mm or more and 7 mm or less, and still more preferably 2 mm or more and 4 mm or less.

The inner corner portion in the boundary area between the first bottom portion 303 and the peripheral wall 205 is illustrated by R501 in FIGS. 5A and 5C.

It is also preferable to form an inner corner portion having a radius of curvature of 1 mm or more and 10 mm or less in a boundary area between the first bottom portion 303 and the first inner wall 206. The inner corner portion in the boundary area between the first bottom portion 303 and the first inner wall 206 is illustrated by R520 in FIGS. 5A and 5B. The radius of curvature is more preferably 1 mm or more and 7 mm or less, and still more preferably 2 mm or more and 4 mm or less.

It is also preferable to form an inner corner portion having a radius of curvature of 1 mm or more and 10 mm or less in a boundary area between the first bottom portion 303 and the second inner wall 207. The inner corner portion in the boundary area between the first bottom portion 303 and the second inner wall 207 is illustrated by R530 in FIGS. 5A and 5B. The radius of curvature is more preferably 1 mm or more and 7 mm or less, and still more preferably 2 mm or more and 4 mm or less.

[Battery Tray: Radius of Curvature of Outer Corner Portion]

It is preferable to form an outer corner portion having a radius of curvature of 2 mm or more and 11 mm or less in a boundary area between the first bottom portion 303 and the peripheral wall 205. The radius of curvature is more preferably 2 mm or more and 8 mm or less, and still more preferably 3 mm or more and 7 mm or less.

The outer corner portion in the boundary area between the first bottom portion 303 and the peripheral wall 205 is illustrated by R502 in FIG. 5C.

It is also preferable to form an outer corner portion having a radius of curvature of 2 mm or more and 11 mm or less in a boundary area between the first bottom portion 303 and the first inner wall 206. The outer corner portion in the boundary area between the first bottom portion 303 and the first inner wall 206 is illustrated by R521 in FIG. 5B. The radius of curvature is more preferably 2 mm or more and 8 mm or less, and still more preferably 3 mm or more and 7 mm or less.

It is also preferable to form an outer corner portion having a radius of curvature of 2 mm or more and 11 mm or less in a boundary area between the first bottom portion 303 and the second inner wall 207. The outer corner portion in the boundary area between the first bottom portion 303 and the second inner wall 207 is illustrated by R531 in FIG. 5B. The radius of curvature is more preferably 2 mm or more and 8 mm or less, and still more preferably 3 mm or more and 7 mm or less.

The radius of curvature of the outer corner portion is preferably larger than that of the inner corner portion.

[Structural Member A]

With an increase in the amount of mounted batteries for automobiles, a size of the battery box 101 is increasing year by year. A length of the battery box 101 in the vehicle width direction is often 70% or more of a width of an automobile, and may be 80% or more of the width of the automobile. Therefore, when a large battery box 101 is mounted on the lower portion of the automobile, a load larger than that in the related art is input to the battery box 101 at the time of collision. Therefore, an energy absorbing structure for protecting the battery itself is required.

The structural member A (108) is a member for ensuring rigidity, and it is also possible to absorb energy at the time of collision. In other words, the structural member A (108) is also an energy absorbing member disposed outside the peripheral wall of the battery tray 105 in the vehicle width direction, and absorbs collision energy from the vehicle width direction.

[Structural Member A: Shape]

Figure 10:
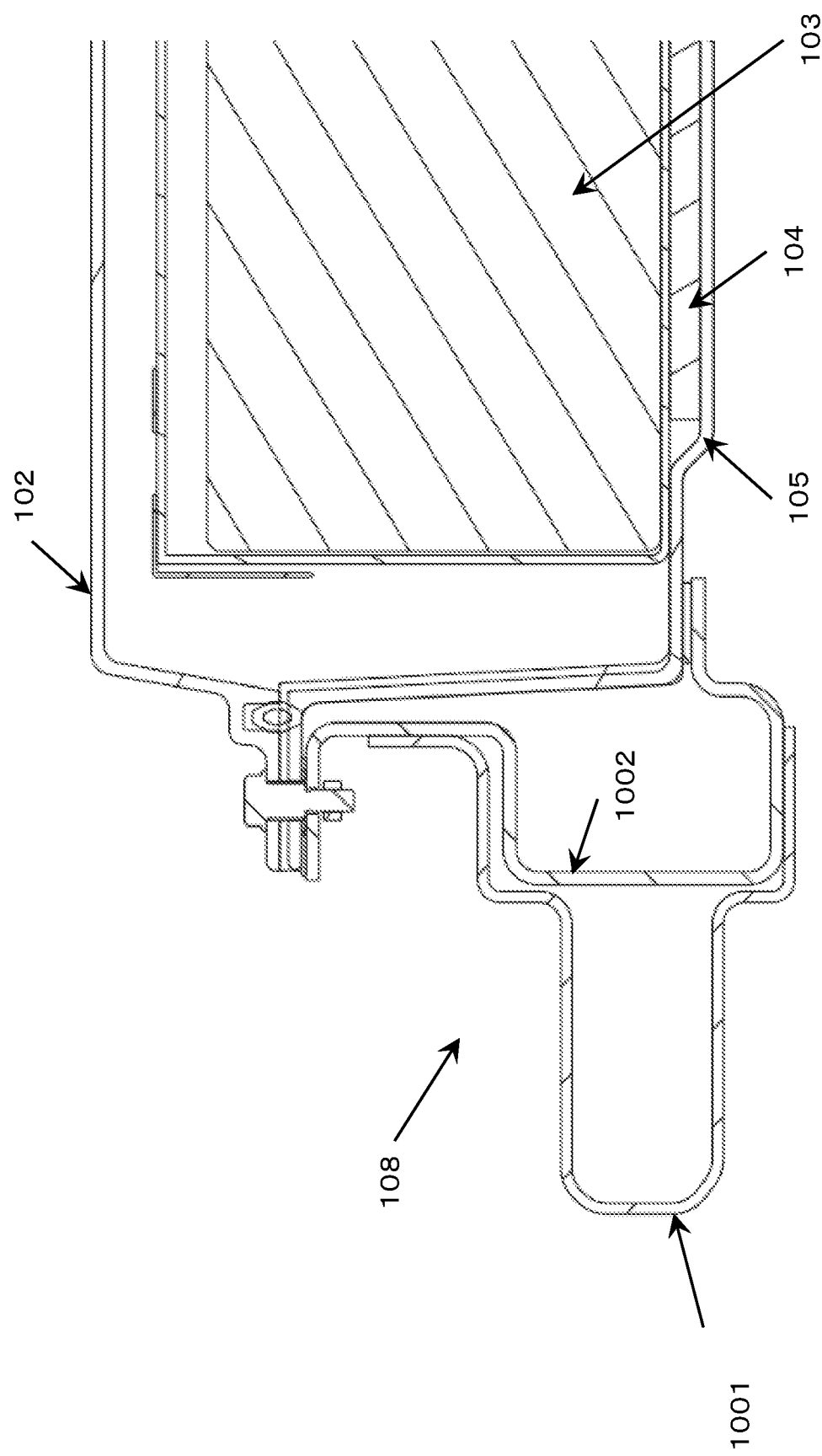
FIG. 10 is a schematic view illustrating an example in which a battery cover, a battery tray, and a structural member A are fastened together.

As illustrated in FIG. 10, the structural member A (108) includes a first vertical wall 1001 and a second vertical wall 1002 located on an inside of the first vertical wall 1001 in the vehicle width direction, and the first vertical wall 1001 and the second vertical wall 1002 extend in the vehicle body front-rear direction.

The minimum thickness of the first vertical wall 1001 is preferably smaller than the maximum thickness of the second vertical wall 1002. The minimum thickness of the first vertical wall 1001 is smaller than the maximum thickness of the second vertical wall 1002, and therefore, when collision energy is applied to a side surface of a vehicle, the first vertical wall 1001 is broken to absorb energy, and the second vertical wall (inner wall) 1002 can protect the battery 103.

In other words, the structural member A (108) preferably includes a first vertical wall 1001 and a second vertical wall 1002 located on an inside of the first vertical wall 1001 in the vehicle width direction, the first vertical wall 1001 and the second vertical wall 1002 preferably extend in a front-rear direction of the vehicle body, and the strength of the first vertical wall 1001 is preferably lower than the strength of the second vertical wall 1002.

A relation between the maximum thickness t2max of the second vertical wall and the minimum thickness t1min of the first vertical wall satisfies t2max×0.9>t1min, and t2max×0.8 t1min

[Height of Structural Member A]

Hereinafter, the vertical position (height) of the structural member A will be described.

The lowermost part of the structural member A (108) is preferably located at a lower position than the lowermost part of the battery tray 105. More preferably, the lowermost part of the structural member A (108) is below the first bottom portion 303 of the battery tray 105, and the uppermost portion of the structural member A (108) is above the first bottom portion 303 of the battery tray 105.

When viewed from the vehicle width direction, the upper end of the first vertical wall 1001 of the structural member A (108) is preferably above the first bottom portion 303 of the battery tray 105, and the lower end of the first vertical wall 1001 of the structural member A (108) is preferably below the first bottom portion 303 of the battery tray 105.

When viewed from the vehicle width direction, the upper end of the second vertical wall 1002 of the structural member A (108) is preferably above the first bottom portion 303 of the battery tray 105, and the lower end of the second vertical wall 1002 of the structural member A (108) is preferably below the first bottom portion 303 of the battery tray 105.

When the first bottom portion 303 of the battery tray 105 is covered with the structural member A (108) when viewed from the vehicle width direction, the first bottom portion 303 of the battery tray 105 can be protected by the structural member A (108) in the event of a collision.

Further, by adjusting the vertical position (height) of the structural member A (108), it is possible to protect the battery tray 105 from the impact received from below when the protective wall 1401 described later is provided.

[Structural Member: Co-Fastening]

The structural member A (108) is located outside the battery tray 105 and the battery cover 102 in the vehicle width direction, and is fastened together with the battery tray 105 and the battery cover 102. By co-fastening in this way, it is possible to utilize the structural rigidity of the battery tray 105 in addition to the vehicle body when an impact is applied to the side surface of the vehicle.

Figure 11:
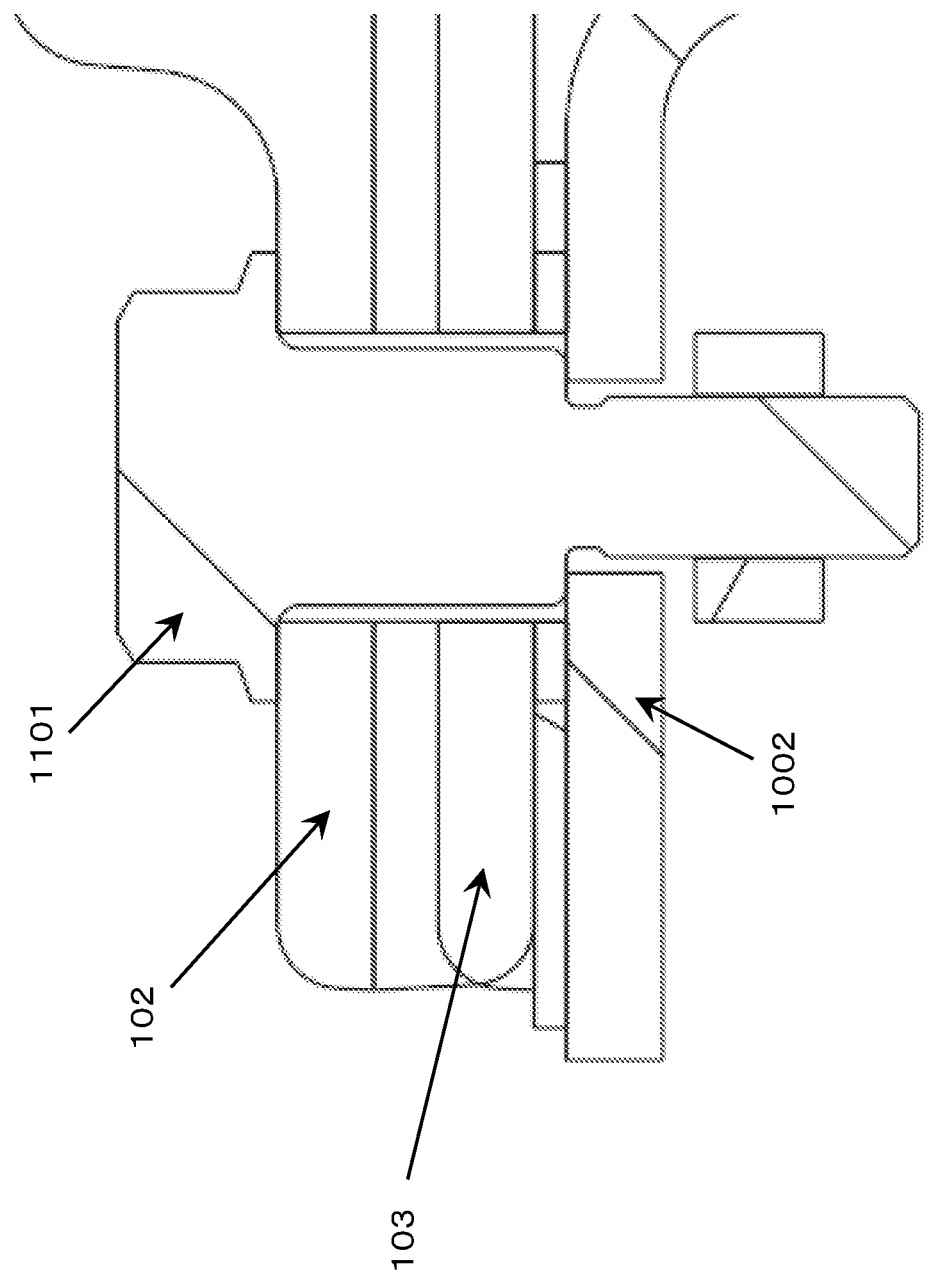
FIG. 11 is an enlarged schematic view of a co-fastened part.

As illustrated in FIG. 11, the structural member A (108) is preferably fastened together with the battery tray 105 and the battery cover 102 by a stepped bolt 1101. The stepped bolt 1101 refers to a bolt whose unthreaded cylindrical portion having a diameter larger than the nominal diameter of a screw. When the battery tray 105 or the battery cover 102 is a component molded by a sheet molding compound, the thickness of the battery tray 105 or the battery cover 102 is reduced (becomes thin) over time due to a creep phenomenon or the like. However, by using the stepped bolt 1101, it is possible to more stably maintain the fastening of the battery cover 102, the battery tray 105, and the structural member A (108) (or the structural members B and C described below).

When the stepped bolt 1101 is used, as illustrated in FIG. 10, it is preferable that the battery cover 102, the battery tray 105, and the structural member A (108) are stacked in this order and fastened together, or the structural member A (108), the battery cover 102, and the battery tray 105 are stacked in this order and fastened together. By stacking in this order, even if the battery tray 105 or the battery cover 102 formed by the sheet molding compound becomes thin (a phenomenon in which the thickness is reduced due to a creep phenomenon or the like), the fastening can be stably maintained.

[Structural Members B and C]

It is preferable to further include a structural member B (1302) provided along an outside of the peripheral wall in the vehicle body front-rear direction as a structural member for absorbing collision energy. In addition, it is preferable to further include a structural member C (1303) at a corner portion of a peripheral wall. The structural member for absorbing the collision energy is provided not only on the outside in the vehicle width direction but also on the entire outside of the peripheral wall, so that there is an effect that the impact input from any direction can be coped with.

It is preferable that the structural member B1302 and the structural member C1303 are also located outside the battery tray 105 and the battery cover 102, and are fastened together with the battery tray 105 and the battery cover 102.

[Protective Wall]

The vehicle structure may include a protective wall below the battery tray.

1. The details are as follows.

Provided is a vehicle structure including a battery tray and a protective wall provided below the battery tray. Each of the battery tray and the protective wall is made of a fiber-reinforced plastic. The protective wall is fastened to at least one location of the battery tray by a fastening rod. An insertion hole for fastening is integrally formed in the battery tray.

Figure 14:
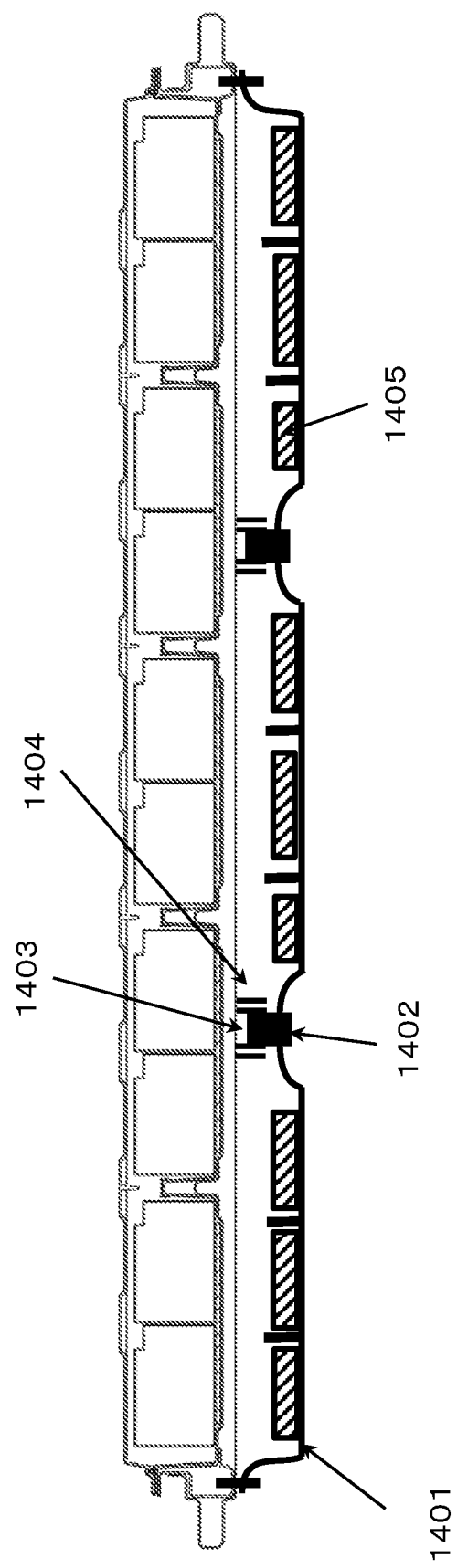
FIG. 14 is a schematic view illustrating an example of a vehicle structure including a protective wall below a battery tray.

An example of the protective wall is illustrated in 1401 of FIG. 14. The fastening rod is denoted by 1402 in FIG. 14, and the insertion hole is denoted by 1403 in FIG. 14.

The protective wall 1401 under the battery tray 105 is preferably connected to the structural member A (108). The protective wall 1401 can protect the battery tray 105 from the impact received from below.

2. Insertion Hole

It is preferable that an insertion table (1404 in FIG. 14) protruding from the battery tray toward the protective wall is provided, and the insertion hole is disposed inside the insertion table.

3. Impact-Absorbing Member

It is preferable to dispose impact-absorbing members (1405 in FIG. 14) between the battery tray and the protective wall. In addition, the impact-absorbing member more preferably has a honeycomb structure. By providing such an impact-absorbing member, the resistance of impact from the lower portion of the vehicle is improved.

4. Aerodynamic Plate for Regulating Airflow

The protective wall is preferably a fiber-reinforced plastic provided with an aerodynamic plate for regulating airflow by integral molding, and the aerodynamic plate for regulating airflow may be provided below the protective wall. By providing the aerodynamic plate for regulating airflow, the aerodynamic drag is reduced, and the running stability of the vehicle is improved.

5. Electromagnetic Wave Shielding Layer

It is preferable to provide an electromagnetic wave shielding layer between the protective wall and the battery tray. More specifically, the electromagnetic wave shielding layer may be provided on an upper surface of the protective wall. In this case, the impact-absorbing member is preferably disposed above the electromagnetic wave shielding layer.

6. Material for Protective Wall 6.1 The protective wall may be a fiber-reinforced plastic obtained by molding a sheet molding compound containing reinforcing fibers and a thermosetting resin.

6.2 The protective wall may be a fiber-reinforced plastic obtained by molding a composite material containing reinforcing fibers and a thermoplastic resin.

7. Thickness of Protective Wall

The thickness of the protective wall is preferably 1 mm or more, more preferably 3 mm or more, and still more preferably 5 mm or more.

[Crash Test Results]

The vehicle structure shown in FIG. 7A was created using glass fiber reinforced plastic (SMC) for the battery cover and battery tray, and using steel for the structural member A. The vehicle structure was tested based on the GB standard 38031-2020 8.2.4 crash test. The maximum reaction force in the X direction (width direction of the vehicle) in FIG. 7A was 230 kN, which exceeded the standard 100 kN.

REFERENCE SIGNS LIST

- 101: Battery box
- 102: Battery cover
- 103: Battery
- 104: Temperature control system (cooling mechanism)
- 105: Battery tray
- 106: Reinforcing frame
- 107: Inner partition wall formed by first inner wall and second inner wall
- 108: Structural member A (member capable of absorbing energy)
- 201: Top portion of inner partition wall
- 205: Peripheral wall
- 206: First inner wall
- 207: Second inner wall
- 208: Recessed portion extending in vehicle width direction
- 301: Second bottom portion
- 302: Cooling mechanism
- 303: First bottom portion
- 304: Metal cover
- 313: Space area surrounded by first inner wall, second inner wall, and second bottom portion (or stud bolt base)
- 402: Flange
- 407: Stud bolt base
- 408: Upper surface of stud bolt base
- 409: Stud bolt
- 411: Battery bracket
- 412: Insertion hole
- α: Angle formed by first bottom portion and first inner wall
- β: Angle formed by first bottom portion and second inner wall
- h1: Height from first bottom portion to flange
- h2: Height from first bottom portion to upper surface of stud bolt base
- h3: Height from first bottom portion to second bottom portion
- R501: Inner corner portion in boundary area between first bottom portion and peripheral wall
- R502: Outer corner portion in boundary area between first bottom portion and peripheral wall
- R520: Inner corner portion in boundary area between first bottom portion and first inner wall
- R521: Outer corner portion in boundary area between first bottom portion and first inner wall
- R530: Inner corner portion in boundary area between first bottom portion and second inner wall
- R531: Outer corner portion in boundary area between first bottom portion and second inner wall
- 701: Cross member
- 702: Rib
- 703: Space between cross member and second bottom portion, which is formed when cross member is inserted into recessed portion
- 801: Battery cover
- 802: Rib
- 1001: First vertical wall
- 1002: Second vertical wall
- 1101: Stepped bolt
- 1201: Fixed point between structural member A and vehicle body
- 1302: Structural member B
- 1303: Structural member C
- 1401: Protective wall
- 1402: Fastening rod
- 1403: Insertion hole
- 1404: Insertion table
- 1405: Impact-absorbing member

The invention claimed is:

1. A vehicle structure disposed at a lower portion of a center of a vehicle body, the vehicle structure comprising
   a battery cover, a battery tray, and a structural member for absorbing impact energy,
   the structural member is located outside in a vehicle width direction of at least one of the battery cover and the battery tray,
   the structural member is fastened together with the battery cover and the battery tray
   wherein the battery cover includes a rib and has a natural frequency in a primary mode of 25 Hz or more; and
   wherein a relation of between a number n1 of fixed points between the structural member and the vehicle body and a number n2 of fixed points between the battery cover and the vehicle body satisfies n1>n2.

2. The vehicle structure according to claim 1, wherein the structural member is fastened together with the battery tray and the battery cover by a stepped bolt.

3. The vehicle structure according to claim 2, wherein the battery cover, the battery tray, and the structural member are stacked and fastened together.

4. The vehicle structure according to claim 2, wherein the structural member, the battery cover, and the battery tray are stacked and fastened together.

5. The vehicle structure according to claim 1,
   wherein the structural member includes a first vertical wall and a second vertical wall located on an inside of the first vertical wall in the vehicle width direction,
   the first vertical wall and the second vertical wall extend in a front-rear direction of the vehicle body, and
   a minimum thickness of the first vertical wall is smaller than a maximum thickness of the second vertical wall.

6. The vehicle structure according to claim 1, wherein each of the battery cover and the battery tray is configured with an integrally molded fiber-reinforced plastic using a sheet molding compound.

7. The vehicle structure according to claim 1,
   wherein a cross member of the structural member is inserted into the battery tray,
   (1) the battery tray includes a first bottom portion, a peripheral wall erected on an outer periphery of the first bottom portion, a first inner wall connected to the first bottom portion, a second inner wall connected to the first bottom portion, and a second bottom portion connected to both the first inner wall and the second inner wall and raised from the first bottom portion,
   (2) the first bottom portion, the peripheral wall, the first inner wall, the second inner wall, and the second bottom portion are configured with an integrally molded fiber-reinforced plastic, and (3) a recessed portion extending in the vehicle width direction is formed by the first inner wall, the second inner wall, and the second bottom portion, and the cross member is inserted into at least one location of the recessed portion.

8. The vehicle structure according to claim 7, wherein the cross member is joined to the structural member.

9. The vehicle structure according to claim 7, wherein an angle formed by the first bottom portion and the first inner wall and an angle formed by the first bottom portion and the second inner wall are 90 degrees or more and 135 degrees or less.

10. The vehicle structure according to claim 7, wherein discontinuous fibers are continuously dispersed in a boundary area between the first bottom portion and the first inner wall, a boundary area between the first bottom portion and the second inner wall, and a boundary area between the first bottom portion and the peripheral wall.

11. The vehicle structure according to claim 1, wherein the fiber-reinforced plastic has a minimum thickness of 1 to 5 mm.

12. The vehicle structure according to claim 1, wherein a lowermost part of the structural member is located at a lower position than a lowermost part of the battery tray.

13. The vehicle structure according to claim 5, wherein an upper end of the first vertical wall of the structural member is above a first bottom portion of the battery tray, and a lower end of the first vertical wall of the structural member is below a first bottom portion of the battery tray.

14. The vehicle structure according to claim 5, wherein an upper end of the second vertical wall of the structural member is above a first bottom portion of the battery tray, and a lower end of the second vertical wall of the structural member is below a first bottom portion of the battery tray.

15. The vehicle structure according to claim 12, further comprising a protective wall below the battery tray, wherein the protective wall is connected to the structural member.

16. The vehicle structure according to claim 1, wherein the structural member comprises a first vertical wall and a second vertical wall located on an inside of the first vertical wall in the vehicle width direction, the first vertical wall and the second vertical wall extend in a front-rear direction of the vehicle body, and a strength of the first vertical wall is lower than a strength of the second vertical wall.

* * * * *